(12) United States Patent
Callebaut et al.

(10) Patent No.: US 12,535,417 B2
(45) Date of Patent: Jan. 27, 2026

(54) ARRAYS OF INTEGRATED ANALYTICAL DEVICES WITH REDUCED-SCALE UNIT CELL

(71) Applicant: Pacific Biosciences of California, Inc., Menlo Park, CA (US)

(72) Inventors: Hans Callebaut, Mountain View, CA (US); Mark McDonald, Milpitas, CA (US); Arghavan Arjmand, Santa Clara, CA (US); Annette Grot, Cupertino, CA (US); Mathieu Foquet, Newark, CA (US); Ravi Saxena, Millbrae, CA (US); Michael Tzu Ru, San Mateo, CA (US)

(73) Assignee: PACIFIC BIOSCIENCES OF CALIFORNIA, INC., Menlo Park, CA (US)

( * ) Notice: Subject to any disclaimer, the term of this patent is extended or adjusted under 35 U.S.C. 154(b) by 644 days.

(21) Appl. No.: 17/736,740

(22) Filed: May 4, 2022

(65) Prior Publication Data
US 2023/0035224 A1    Feb. 2, 2023

Related U.S. Application Data

(60) Provisional application No. 63/184,195, filed on May 4, 2021.

(51) Int. Cl.
| | | |
|---|---|---|
| *G01N 21/64* | (2006.01) | |
| *C12Q 1/6874* | (2018.01) | |
| *G01N 35/00* | (2006.01) | |

(52) U.S. Cl.
CPC ....... *G01N 21/6428* (2013.01); *C12Q 1/6874* (2013.01); *G01N 21/6486* (2013.01);
(Continued)

(58) Field of Classification Search
CPC .......... G01N 21/6428; G01N 21/6486; G01N 35/00029; G01N 35/0092;
(Continued)

(56) References Cited

U.S. PATENT DOCUMENTS

| | | |
|---|---|---|
| 4,645,523 A | 2/1987 | Howard et al. |
| 5,082,629 A | 1/1992 | Burgess, Jr. et al. |

(Continued)

FOREIGN PATENT DOCUMENTS

| | | |
|---|---|---|
| EP | 1105529 B1 | 11/2005 |
| EP | 1871902 B1 | 10/2010 |

(Continued)

OTHER PUBLICATIONS

Abbas et al. (2011) Sens. Actuators B Chem. 156:169-175.
(Continued)

*Primary Examiner* — David J Makiya
*Assistant Examiner* — Gisselle M Gutierrez
(74) *Attorney, Agent, or Firm* — VLP Law Group LLP

(57) ABSTRACT

Arrays of integrated analytical devices are provided. The arrays are useful in the analysis of highly multiplexed optical reactions in large numbers at high densities, including biochemical reactions, such as nucleic acid sequencing reactions. In particular, the arrays provide increased efficiency of optical collection and decreased background signal as the lateral dimensions of the unit cell of devices within the array are decreased, for example as they are decreased to 2 µm, or even less.

37 Claims, 15 Drawing Sheets

(52) U.S. Cl.
CPC ... *G01N 35/00029* (2013.01); *G01N 35/0092* (2013.01); *G01N 2035/00158* (2013.01); *G01N 2201/0461* (2013.01)

(58) Field of Classification Search
CPC . G01N 2035/00158; G01N 2201/0461; G01N 21/648; G01N 21/6454; G01N 2021/6463; G01N 2021/6471; G01N 2021/6482; G01N 21/645; C12Q 1/6874; C12Q 1/6869
See application file for complete search history.

(56) References Cited

U.S. PATENT DOCUMENTS

| | | | |
|---|---|---|---|
| 5,094,517 A | 3/1992 | Franke | |
| 5,135,876 A | 8/1992 | Andrade et al. | |
| 5,157,262 A | 10/1992 | Marsoner et al. | |
| 5,159,661 A | 10/1992 | Ovshinsky et al. | |
| 5,173,747 A | 12/1992 | Boiarski et al. | |
| 5,192,502 A | 3/1993 | Attridge et al. | |
| 5,233,673 A | 8/1993 | Vali et al. | |
| 5,239,178 A | 8/1993 | Derndinger et al. | |
| 5,303,026 A * | 4/1994 | Strobl | G01N 21/6486 600/478 |
| 5,439,647 A | 8/1995 | Saini | |
| 5,446,534 A | 8/1995 | Goldman | |
| 5,470,710 A | 11/1995 | Weiss et al. | |
| 5,545,531 A | 8/1996 | Rava et al. | |
| 5,578,832 A | 11/1996 | Trulson et al. | |
| 5,605,662 A | 2/1997 | Heller et al. | |
| 5,631,734 A | 5/1997 | Stern et al. | |
| 5,677,196 A | 10/1997 | Herron et al. | |
| 5,695,934 A | 12/1997 | Brenner | |
| 5,744,305 A | 4/1998 | Fodor et al. | |
| 5,812,709 A | 9/1998 | Arai et al. | |
| 5,821,058 A | 10/1998 | Smith et al. | |
| 5,832,165 A | 11/1998 | Reichert et al. | |
| 5,835,649 A * | 11/1998 | Turner | G01N 21/645 385/12 |
| 5,867,266 A | 2/1999 | Craighead | |
| 5,919,712 A | 7/1999 | Herron et al. | |
| 6,002,520 A | 12/1999 | Hoch et al. | |
| 6,071,748 A | 6/2000 | Modlin et al. | |
| 6,192,168 B1 | 2/2001 | Feldstein et al. | |
| 6,210,896 B1 | 4/2001 | Chan | |
| 6,236,945 B1 | 5/2001 | Simpson et al. | |
| 6,263,286 B1 | 7/2001 | Gilmanshin et al. | |
| 6,325,977 B1 | 12/2001 | Theil | |
| 6,388,788 B1 | 5/2002 | Harris et al. | |
| 6,437,345 B1 | 8/2002 | Bruno-Raimondi et al. | |
| 6,438,279 B1 | 8/2002 | Craighead et al. | |
| 6,603,537 B1 | 8/2003 | Dietz et al. | |
| 6,611,634 B2 | 8/2003 | Herron et al. | |
| 6,664,071 B1 | 12/2003 | Windhab et al. | |
| 6,690,002 B2 | 2/2004 | Kuroda et al. | |
| 6,699,655 B2 | 3/2004 | Nikiforov | |
| 6,784,982 B1 | 8/2004 | Blumenfeld et al. | |
| 6,800,860 B2 | 10/2004 | Dietz et al. | |
| 6,818,395 B1 | 11/2004 | Quake et al. | |
| 6,867,851 B2 | 3/2005 | Blumenfeld et al. | |
| 6,870,613 B1 * | 3/2005 | Tisone | G01J 3/4406 356/317 |
| 6,917,726 B2 | 7/2005 | Levene et al. | |
| 6,919,211 B1 | 7/2005 | Fodor et al. | |
| 6,979,830 B2 | 12/2005 | Dietz et al. | |
| 6,982,146 B1 | 1/2006 | Schneider et al. | |
| 6,987,613 B2 | 1/2006 | Pocius et al. | |
| 7,013,054 B2 | 3/2006 | Levene et al. | |
| 7,022,515 B2 | 4/2006 | Herron et al. | |
| 7,033,542 B2 * | 4/2006 | Archibald | G01N 21/552 422/50 |
| 7,056,661 B2 | 6/2006 | Korlach et al. | |
| 7,057,832 B2 | 6/2006 | Wu et al. | |
| 7,075,695 B2 | 7/2006 | Gronbach | |
| 7,081,954 B2 | 7/2006 | Sandstrom | |
| 7,083,914 B2 | 8/2006 | Seul et al. | |
| 7,130,041 B2 | 10/2006 | Bouzid et al. | |
| 7,135,667 B2 | 11/2006 | Oldham et al. | |
| 7,139,074 B2 | 11/2006 | Reel | |
| 7,145,645 B2 | 12/2006 | Blumenfeld et al. | |
| 7,150,997 B2 | 12/2006 | Kovacs | |
| 7,170,050 B2 | 1/2007 | Turner et al. | |
| 7,175,811 B2 | 2/2007 | Bach et al. | |
| 7,181,122 B1 | 2/2007 | Levene et al. | |
| 7,189,361 B2 | 3/2007 | Carson et al. | |
| 7,197,196 B2 | 3/2007 | Lin et al. | |
| 7,199,357 B1 | 4/2007 | Oldham et al. | |
| 7,209,836 B1 | 4/2007 | Schermer et al. | |
| 7,227,128 B2 | 6/2007 | Sagatelyan | |
| 7,227,642 B2 * | 6/2007 | Oida | G01N 21/05 356/439 |
| RE39,772 E | 8/2007 | Herron et al. | |
| 7,257,141 B2 | 8/2007 | Chua | |
| 7,302,348 B2 | 11/2007 | Ghosh et al. | |
| 7,315,019 B2 | 1/2008 | Turner et al. | |
| 7,323,681 B1 | 1/2008 | Oldham et al. | |
| 7,400,380 B2 | 7/2008 | Hahn | |
| 7,486,865 B2 | 2/2009 | Foquet et al. | |
| 7,499,094 B2 | 3/2009 | Kuriyama | |
| 7,537,734 B2 | 5/2009 | Reichert et al. | |
| 7,709,808 B2 | 5/2010 | Reel et al. | |
| 7,767,441 B2 | 8/2010 | Chiou et al. | |
| 7,811,810 B2 | 10/2010 | Chiou et al. | |
| 7,817,281 B2 | 10/2010 | Kiesel et al. | |
| 7,820,983 B2 | 10/2010 | Lundquist et al. | |
| 7,834,329 B2 | 11/2010 | Lundquist et al. | |
| 7,838,847 B2 | 11/2010 | Lundquist et al. | |
| 7,907,800 B2 | 3/2011 | Foquet et al. | |
| 7,924,374 B2 | 4/2011 | Chang | |
| 8,053,742 B2 | 11/2011 | Lundquist et al. | |
| 8,177,408 B1 | 5/2012 | Coleman | |
| 8,207,509 B2 | 6/2012 | Lundquist et al. | |
| 8,247,216 B2 | 8/2012 | Zaccarin et al. | |
| 8,274,040 B2 | 9/2012 | Zhong et al. | |
| 8,325,349 B2 | 12/2012 | Cui et al. | |
| 8,411,375 B2 | 4/2013 | Lenchenkov | |
| 8,465,699 B2 | 6/2013 | Fehr et al. | |
| 8,467,061 B2 | 6/2013 | McCaffrey et al. | |
| 8,471,219 B2 | 6/2013 | Lundquist et al. | |
| 8,564,095 B2 | 10/2013 | Huang et al. | |
| 8,618,507 B1 | 12/2013 | Lundquist et al. | |
| 8,747,751 B2 | 6/2014 | Duer et al. | |
| 8,906,320 B1 | 12/2014 | Eltoukhy et al. | |
| 8,994,946 B2 | 3/2015 | McCaffrey et al. | |
| 9,029,802 B2 | 5/2015 | Lundquist et al. | |
| 9,223,084 B2 | 12/2015 | Grot et al. | |
| 9,372,308 B1 | 6/2016 | Saxena et al. | |
| 10,234,393 B2 | 3/2019 | Grot et al. | |
| 10,393,725 B2 * | 8/2019 | Ghosh | G02B 5/0294 |
| 11,061,019 B2 * | 7/2021 | Chen | G01J 3/10 |
| 2002/0034457 A1 | 3/2002 | Reichert et al. | |
| 2002/0110839 A1 | 8/2002 | Bach et al. | |
| 2002/0113213 A1 | 8/2002 | Amirkhanian et al. | |
| 2002/0146047 A1 | 10/2002 | Bendett et al. | |
| 2003/0044160 A1 | 3/2003 | Jones et al. | |
| 2003/0044781 A1 | 3/2003 | Korlach et al. | |
| 2003/0132406 A1 | 7/2003 | Waldhausl et al. | |
| 2003/0138180 A1 | 7/2003 | Kondo et al. | |
| 2003/0174324 A1 | 9/2003 | Sandstrom | |
| 2003/0174992 A1 | 9/2003 | Levene et al. | |
| 2004/0040868 A1 | 3/2004 | DeNuzzio et al. | |
| 2004/0046128 A1 | 3/2004 | Abel et al. | |
| 2004/0197793 A1 | 10/2004 | Hassibi et al. | |
| 2004/0234417 A1 | 11/2004 | Schienle et al. | |
| 2004/0249227 A1 | 12/2004 | Klapproth et al. | |
| 2005/0006607 A1 | 1/2005 | Winter et al. | |
| 2005/0014178 A1 | 1/2005 | Holm-Kennedy | |
| 2005/0135974 A1 | 6/2005 | Harvey et al. | |
| 2005/0175273 A1 | 8/2005 | Iida et al. | |
| 2005/0201899 A1 | 9/2005 | Weisbuch | |
| 2005/0206895 A1 | 9/2005 | Salmelainen | |
| 2006/0060766 A1 | 3/2006 | Turner et al. | |
| 2006/0103850 A1 | 5/2006 | Alphonse et al. | |

(56) References Cited

U.S. PATENT DOCUMENTS

| | | |
|---|---|---|
| 2007/0036511 A1 | 2/2007 | Lundquist et al. |
| 2007/0099212 A1 | 5/2007 | Harris |
| 2007/0134128 A1 | 6/2007 | Korlach |
| 2007/0146701 A1 | 6/2007 | Kiesel et al. |
| 2007/0188746 A1 | 8/2007 | Kraus et al. |
| 2007/0196815 A1 | 8/2007 | Lappe et al. |
| 2008/0002929 A1 | 1/2008 | Bowers et al. |
| 2008/0020938 A1 | 1/2008 | Kaplan |
| 2008/0039339 A1 | 2/2008 | Hassibi et al. |
| 2008/0056950 A1 | 3/2008 | Weisbuch et al. |
| 2008/0161195 A1 | 7/2008 | Turner et al. |
| 2008/0176769 A1 | 7/2008 | Rank et al. |
| 2008/0212960 A1 | 9/2008 | Lundquist et al. |
| 2008/0274559 A1 | 11/2008 | Fleischer et al. |
| 2009/0146076 A1 | 6/2009 | Chiou et al. |
| 2009/0181396 A1 | 7/2009 | Luong et al. |
| 2009/0208957 A1 | 8/2009 | Korlach et al. |
| 2009/0247414 A1 | 10/2009 | Obradovic et al. |
| 2009/0311774 A1 | 12/2009 | Chiou et al. |
| 2010/0065726 A1 | 3/2010 | Zhong et al. |
| 2010/0099100 A1* | 4/2010 | Zaccarin ............... B05D 1/005 385/38 |
| 2010/0121582 A1 | 5/2010 | Pan et al. |
| 2010/0163521 A1 | 7/2010 | Balamane et al. |
| 2010/0165134 A1 | 7/2010 | Dowski, Jr. et al. |
| 2010/0255488 A1 | 10/2010 | Kong et al. |
| 2010/0256918 A1 | 10/2010 | Chen et al. |
| 2010/0295083 A1 | 11/2010 | Celler |
| 2010/0317116 A1 | 12/2010 | Flusberg et al. |
| 2011/0069389 A1 | 3/2011 | Shpunt |
| 2011/0117637 A1 | 5/2011 | Gray et al. |
| 2011/0183409 A1 | 7/2011 | Newby et al. |
| 2011/0210094 A1 | 9/2011 | Gray et al. |
| 2011/0222179 A1 | 9/2011 | Monadgemi |
| 2011/0223590 A1 | 9/2011 | Chiou et al. |
| 2011/0257040 A1 | 10/2011 | Turner et al. |
| 2011/0306039 A1 | 12/2011 | Chiou et al. |
| 2011/0306143 A1 | 12/2011 | Chiou et al. |
| 2012/0014837 A1 | 1/2012 | Fehr et al. |
| 2012/0019828 A1 | 1/2012 | McCaffrey et al. |
| 2012/0021525 A1 | 1/2012 | Fehr et al. |
| 2012/0052506 A1 | 3/2012 | Yue et al. |
| 2012/0058469 A1 | 3/2012 | Shen |
| 2012/0058473 A1 | 3/2012 | Yue et al. |
| 2012/0058482 A1 | 3/2012 | Shen et al. |
| 2012/0077189 A1 | 3/2012 | Shen et al. |
| 2012/0085894 A1 | 4/2012 | Zhong et al. |
| 2012/0156100 A1 | 6/2012 | Tsai et al. |
| 2013/0043552 A1 | 2/2013 | Lazarov et al. |
| 2013/0148682 A1 | 6/2013 | Zhang et al. |
| 2013/0338010 A1* | 12/2013 | Turner ............... G01N 21/648 506/2 |
| 2014/0191348 A1 | 7/2014 | Humbert et al. |
| 2014/0193331 A1 | 7/2014 | Naczynski et al. |
| 2014/0199016 A1 | 7/2014 | Grot et al. |
| 2014/0241682 A1 | 8/2014 | Sandhu et al. |
| 2014/0285753 A1 | 9/2014 | Nagato et al. |
| 2014/0287964 A1 | 9/2014 | Lundquist et al. |
| 2014/0353577 A1 | 12/2014 | Agarwal et al. |
| 2015/0177150 A1* | 6/2015 | Rothberg ............ G01N 21/7746 506/38 |
| 2015/0286060 A1 | 10/2015 | Roh et al. |
| 2016/0061740 A1* | 3/2016 | Grot ................... G02B 27/4244 506/18 |
| 2016/0154165 A1 | 6/2016 | Grot et al. |
| 2016/0254312 A1 | 9/2016 | Lee et al. |
| 2016/0273034 A1 | 9/2016 | Lundquist et al. |
| 2016/0363728 A1 | 12/2016 | Wang et al. |
| 2017/0007163 A1* | 1/2017 | Takahashi .......... G01N 21/8507 |
| 2017/0082544 A1 | 3/2017 | Van Dorpe et al. |
| 2017/0145498 A1* | 5/2017 | Saxena ................. G02B 5/288 |
| 2017/0167979 A1* | 6/2017 | Rulison ................. G02B 5/045 |
| 2017/0176335 A1* | 6/2017 | Grot .................. H01L 27/14685 |
| 2017/0299518 A1* | 10/2017 | Rothberg ............. C12Q 1/6869 |
| 2018/0180548 A1* | 6/2018 | Grot ....................... G01N 21/78 |
| 2020/0018703 A1* | 1/2020 | Grot ................... G02B 27/4244 |
| 2020/0171484 A1 | 6/2020 | Chen et al. |
| 2021/0148821 A1 | 5/2021 | Rothberg et al. |
| 2021/0215606 A1* | 7/2021 | Schmid ............... G02B 6/1228 |
| 2021/0325306 A1* | 10/2021 | Grot ................... G02B 27/4238 |
| 2022/0214279 A1 | 7/2022 | Rothberg et al. |
| 2023/0035224 A1* | 2/2023 | Callebaut ............ G01N 21/648 |
| 2023/0314325 A1* | 10/2023 | Grot ................. H01L 27/14685 438/70 |
| 2023/0375475 A1 | 11/2023 | Rothberg et al. |
| 2025/0093264 A1* | 3/2025 | Schmid ............. G01N 21/6454 |

FOREIGN PATENT DOCUMENTS

| | | |
|---|---|---|
| EP | 2362209 B1 | 10/2015 |
| KR | 20050088782 A | 9/2005 |
| WO | 1991006678 A1 | 5/1991 |
| WO | 2001016375 A2 | 3/2001 |
| WO | 2004100068 A2 | 11/2004 |
| WO | 2006116726 A2 | 11/2006 |
| WO | 2006135782 A2 | 12/2006 |
| WO | 2007002367 A2 | 1/2007 |
| WO | 2007011549 A1 | 1/2007 |
| WO | 2008002765 A2 | 1/2008 |
| WO | 2009056065 A1 | 5/2009 |
| WO | 2009131535 A1 | 10/2009 |
| WO | 2009149125 A2 | 12/2009 |
| WO | 2010051773 A1 | 5/2010 |
| WO | 2010102567 A1 | 9/2010 |
| WO | 2011076132 A2 | 6/2011 |
| WO | 2014031157 A1 | 2/2014 |
| WO | 2016023010 A1 | 2/2016 |
| WO | 2016023011 A1 | 2/2016 |
| WO | 2018013243 A1 | 1/2018 |
| WO | 2018112170 A1 | 6/2018 |
| WO | 2021026291 A1 | 2/2021 |

OTHER PUBLICATIONS

Barrios (2006) IEEE Photon Technol. Lett. 18:2419.
Barrios et al. (2007) Optics Letters 32:3080.
Barrios et al. (2008) Optics Letters 33:708.
Bernini et al. (2005) Proc. SPIE 5728:101-111.
Boiarski et al. (1992) Proc. SPIE 1793:199-211.
Budach et al. (1999) Anal. Chem. 71(16):3347-3355.
Chen et al. (2012) Optics Letters 37:2814.
Cottier et al. (2002) Proc. SPIE 4616:53-63.
Deopura, M. et al. (2001) Optics Lett 26(15):1197-1199.
Duveneck et al. (2002) Anal Chem Acta 469:49-61.
Eid et al. (2009) Science 323:133.
Feldstein et al. (1999) J. Biomed Microdev. 1:139-153.
Feng et al. (2006) IEEE J. Quantum Electron. 42:885.
Feng et al. (2007) Optics Letters 32:2131.
Fink, Y. et al. (1998) Science 282:1679-1682.
Fonollosa et al. (2006) Proceedings of SPIE 61860R-1: 61860R-11.
Golub (2004) Optics & Photonics News "Laser Beam Splitting by Diffractive Optics" 36-41.
Herron et al. (2003) Biopolymers at Interfaces 2nd Ed, Surfactant Science Series vol. 110, Marcel Dekker, NY pp. 115-163.
Laurell et al. (2012) Optics Express 20:22308.
Leger et al. (1988) The Lincoln Laboratory Journal 1(2):225-246.
Levene, M.J. et al. (2003) Science 299:682-686.
Mortazavi et al. (1994) Optics Letters 19:1290.
Nava et al. (2010) Electronics Letters 46:1686.
Pan et al. (2011) Optics Communications 284:429.
Pang et al. (2011) Lab Chip 11:3698-3702.
Psaltis et al. (2006) Nature 442:381.
Robinson et al. (2008) Optics Express 16:4296.
Sahin et al. (2011) J. Nanophoton. 5:051812.
Salama et al. (2004) Biosensors & Bioelectronics 19:1377-1386.
Song et al. (2012) Optics Express 20:22290.
Sun et al. (2007) Optics Express 15:17967.
Weissman et al. (1999) Proc. SPIE 3596:210-216.
Wu et al. (2006) Biosensors and Bioelectronics 21:1252-1263.

(56) References Cited

OTHER PUBLICATIONS

Yao et al. (2012) Nonlinear Optics and Solid-State Lasers, Springer-Verlag Berlin Heidelberg, Chapter 5.
Yariv, A. et al. (1977) IEEE J Quantum Elec QE—13(4):233-253.
International Search Report and Written Opinion dated Sep. 1, 2022 for related PCT/US2022/027664.
Extended European Search Report dated Feb. 13, 2025 for related EP22799506.5.

* cited by examiner

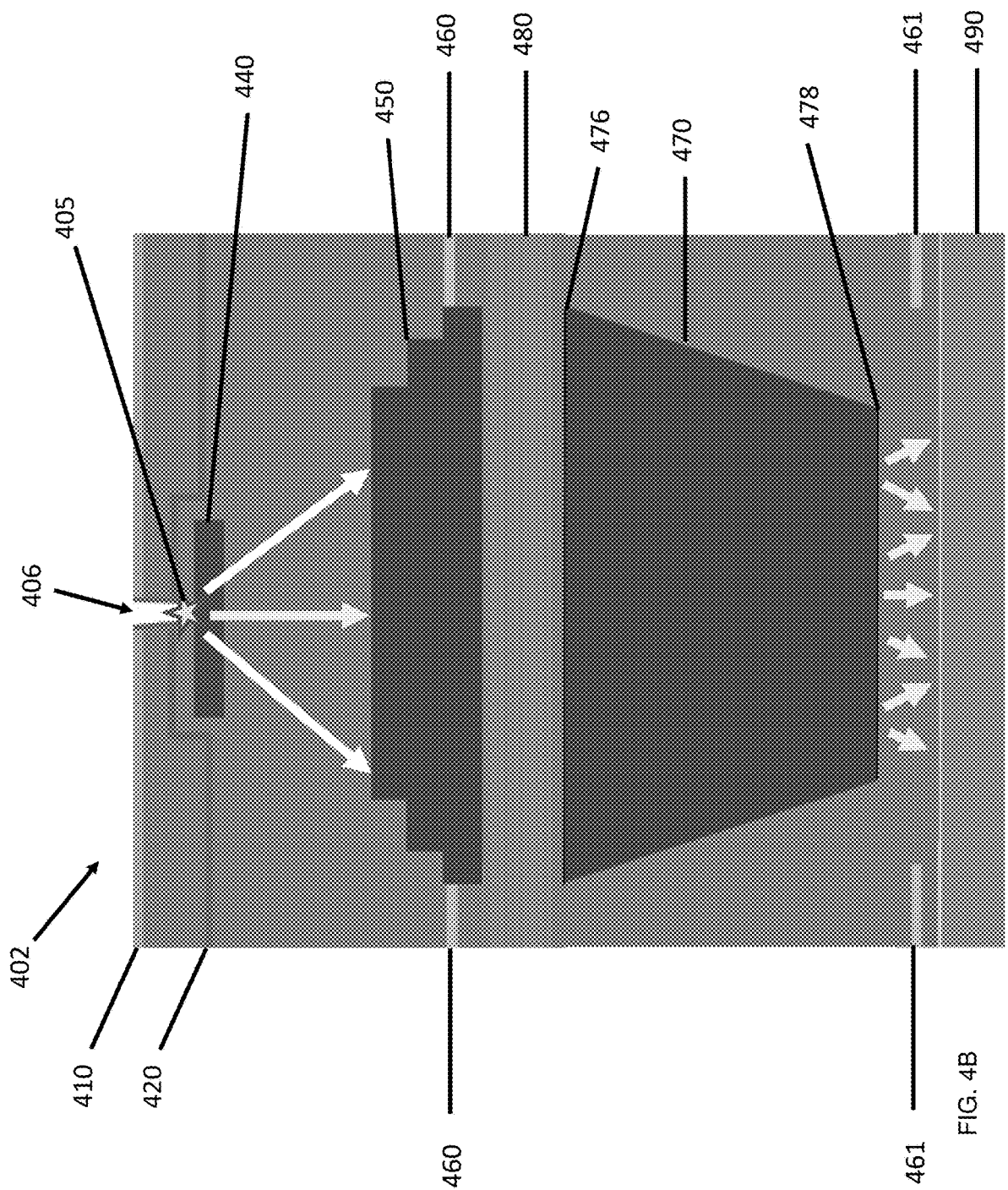

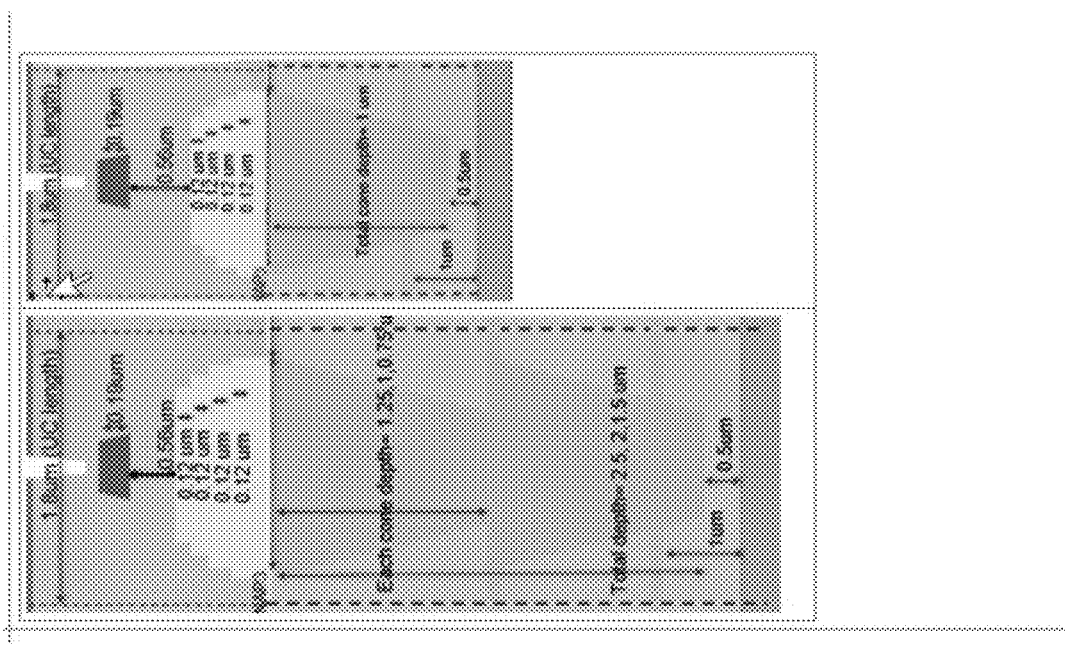
FIG. 6E
FIG. 6D
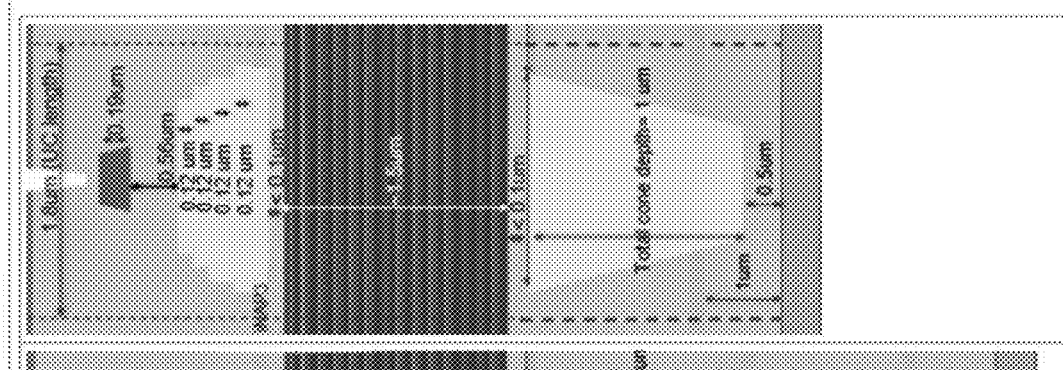
FIG. 6C
FIG. 6B
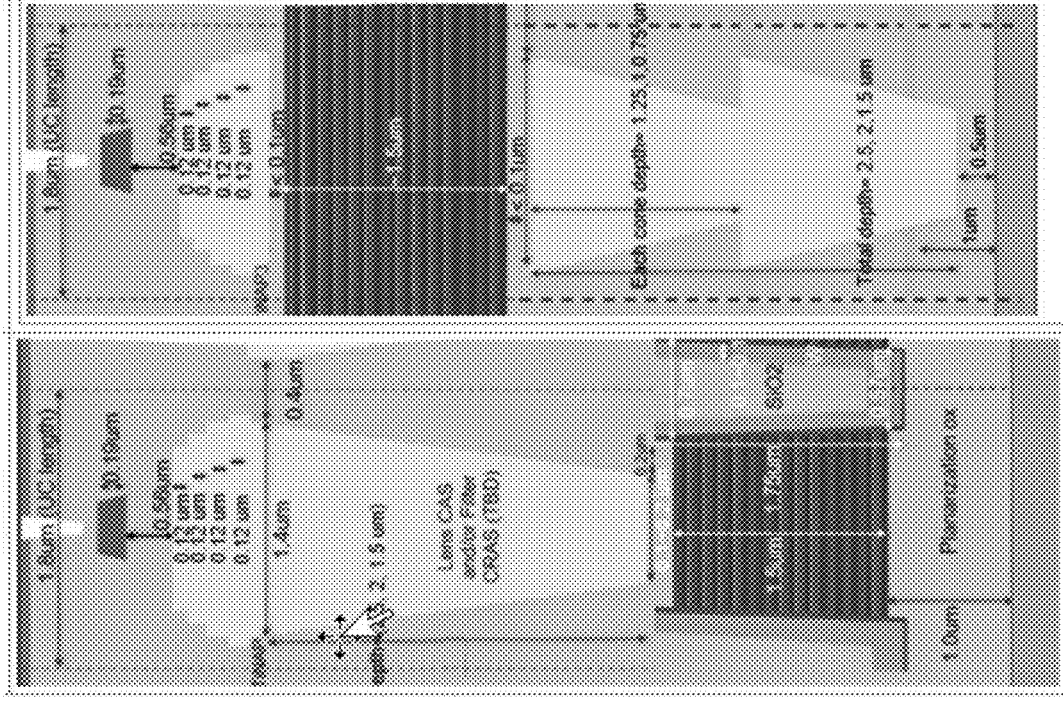
FIG. 6A

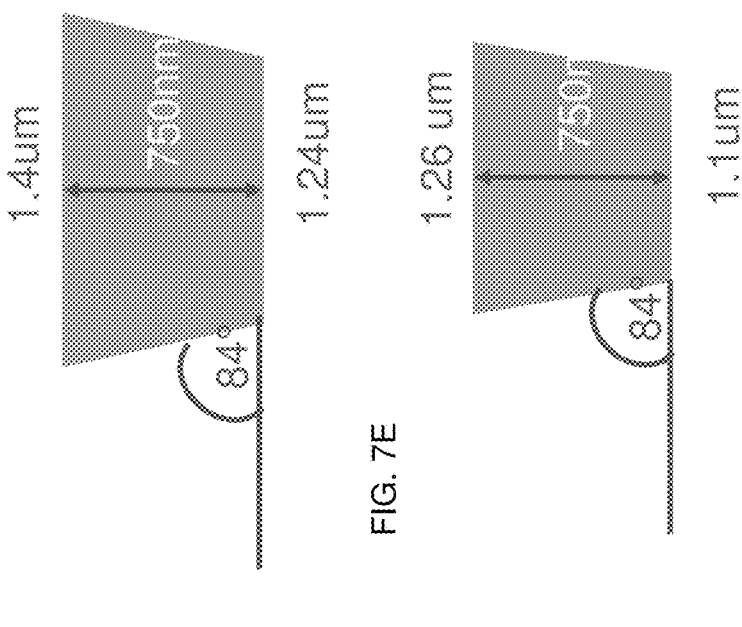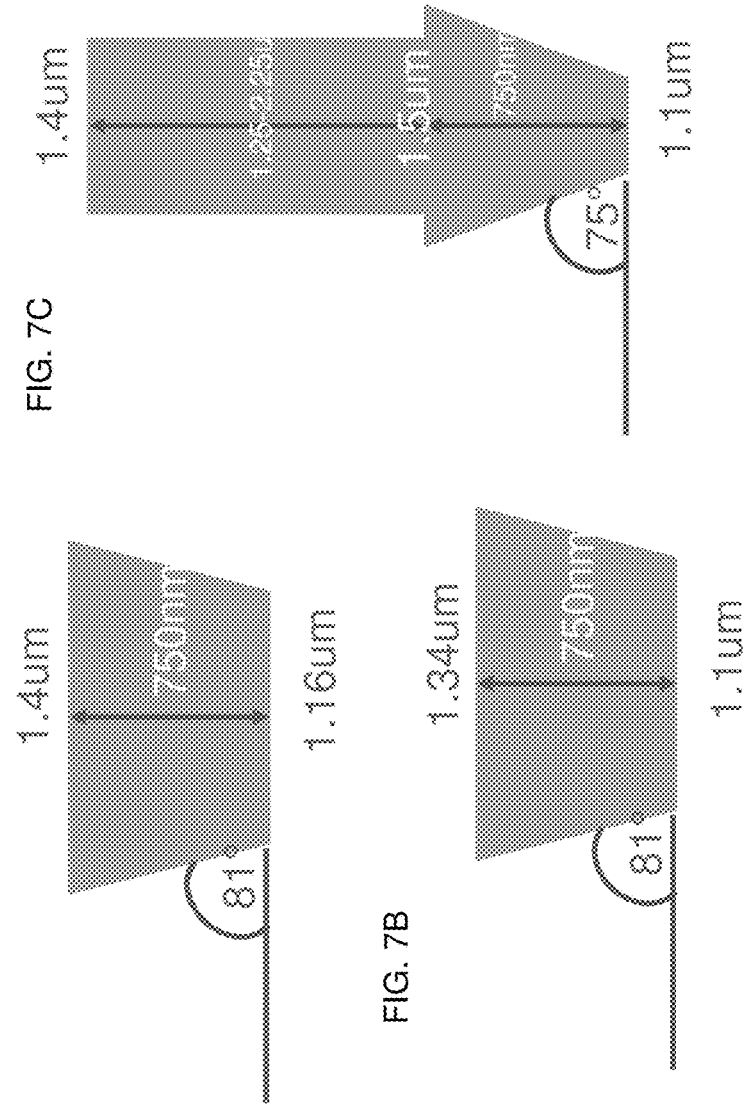

ARRAYS OF INTEGRATED ANALYTICAL DEVICES WITH REDUCED-SCALE UNIT CELL

CROSS-REFERENCE TO RELATED APPLICATIONS

This application claims the benefit of U.S. Provisional Application No. 63/184,195, filed on May 4, 2021, the disclosure of which is incorporated herein by reference in its entirety.

STATEMENT REGARDING FEDERALLY SPONSORED RESEARCH

Not Applicable.

BACKGROUND OF THE INVENTION

In analytical systems, the ability to increase the number of analyses being carried out at any given time by a given system has been a key component to increasing the utility and extending the lifespan of such systems. In particular, by increasing the multiplex factor of analyses with a given system, one can increase the overall throughput of the system, thereby increasing its usefulness while decreasing the costs associated with that use.

In optical analyses, increasing multiplex often poses increased difficulties, as it can require more complex optical systems, increased illumination or detection capabilities, and new reaction containment strategies. In some cases, systems seek to increase multiplex by many fold, and even orders of magnitude, which further implicate these considerations. Likewise, in certain cases, the analytical environment for which the systems are to be used is so highly sensitive that variations among different analyses in a given system may not be tolerable. These goals are often at odds with a brute force approach of simply making systems bigger and of higher power, as such steps often give rise to even greater consequences, e.g., in inter reaction cross-talk, decreased signal to noise ratios resulting from either or both of lower signal and higher noise, and the like. It would therefore be desirable to provide analytical systems that have substantially increased multiplex for their desired analysis, and particularly for use in highly sensitive reaction analyses, and in many cases, to do so while minimizing negative impacts of such increased multiplex.

At the same time, there is a continuing need to increase the performance of analytical systems and reduce the cost associated with manufacturing and using the system. In particular, there is a continuing need to increase the throughput of analytical systems while at the same time reducing the size and complexity of analytical systems. There is a continuing need for analytical systems that have flexible configurations and are easily scalable.

SUMMARY OF THE INVENTION

The instant invention addresses these and other problems by providing in one aspect an array of integrated analytical devices, each device comprising:
a nanoscale emission volume;
an excitation source optically coupled to the nanoscale emission volume;
detector layer optically coupled to the nanoscale emission volume;
an upper light-directing element disposed between the nanoscale emission volume and the detector layer; and
a lower light-directing element disposed between the upper light-directing element and the detector layer;
wherein an optical signal is emitted from the nanoscale emission volume; and
wherein the upper light-directing element directs the optical signal from the nanoscale emission volume through the lower light-directing element to a sensing region in the detector layer.

In some aspects, the techniques described herein relate to an array, wherein each device in the array has a maximum lateral dimension of no more than about 3.0 µm.

In some aspects, the techniques described herein relate to an array, wherein each device in the array has a maximum vertical dimension of no more than about 25 µm.

In some aspects, the techniques described herein relate to an array, wherein there is a distance between the nanoscale emission volume and the upper light-directing element that is no more than about 5 µm.

In some aspects, the techniques described herein relate to an array, wherein there is a distance between the lower light-directing element and the sensing region that is no more than about 5 µm.

In some aspects, the techniques described herein relate to an array, wherein the lower light-directing element includes a truncated cone shape, a cylindrical pillar shape, an oval pillar shape, a square pillar shape, a rectangular pillar shape, or a combination of these shapes.

In some aspects, the techniques described herein relate to an array, wherein the lower light-directing element includes a truncated cone shape.

In some aspects, the techniques described herein relate to an array, wherein the lower light-directing element includes a plurality of truncated cone shapes.

In some aspects, the techniques described herein relate to an array, wherein the lower light-directing element includes a cylindrical pillar shape.

In some aspects, the techniques described herein relate to an array, wherein the lower light-directing element includes a truncated cone shape and a cylindrical pillar shape.

In some aspects, the techniques described herein relate to an array, wherein the lower light-directing element includes a high-index core material embedded in a low-index cladding material.

In some aspects, the techniques described herein relate to an array, wherein the optical signal is generated by a plurality of optical emitters within the nanoscale emission volume.

In some aspects, the techniques described herein relate to an array, wherein each optical emitter in the plurality of optical emitters has a different amplitude of emission.

In some aspects, the techniques described herein relate to an array, wherein the detector layer of each device includes a single sensing region.

In some aspects, the techniques described herein relate to an array, wherein the upper light-directing element includes a diffractive optical element.

In some aspects, the techniques described herein relate to an array, wherein the diffractive optical element is a Fresnel lens.

In some aspects, the techniques described herein relate to an array, wherein the upper light-directing element includes amorphous silicon.

In some aspects, the techniques described herein relate to an array, further including a laser-rejection filter.

In some aspects, the techniques described herein relate to an array, wherein the laser-rejection filter includes a thin-film interference filter.

In some aspects, the techniques described herein relate to an array, wherein the laser-rejection filter is configured to decrease transmission of an excitation signal from the excitation source.

In some aspects, the techniques described herein relate to an array, wherein the laser-rejection filter is configured to allow transmission of the optical signal emitted from the nanoscale emission volume.

In some aspects, the techniques described herein relate to an array, wherein the laser-rejection filter is disposed between the lower light-directing element and the detector layer.

In some aspects, the techniques described herein relate to an array, wherein the laser-rejection filter is disposed between the upper light-directing element and the lower light-directing element.

In some aspects, the techniques described herein relate to an array, wherein the laser-rejection filter includes a selectively absorptive material.

In some aspects, the techniques described herein relate to an array, wherein the selectively absorptive material is a dielectric material.

In some aspects, the techniques described herein relate to an array, wherein the dielectric material is amorphous silicon or silicon nitride.

In some aspects, the techniques described herein relate to an array, wherein the laser-rejection filter and the lower light-directing element include a selectively absorptive material.

In some aspects, the techniques described herein relate to an array, wherein each device further includes a baffle element.

In some aspects, the techniques described herein relate to an array, wherein the baffle element is prepared by etching a trench between each device.

In some aspects, the techniques described herein relate to an array, wherein the baffle element includes an opaque, absorptive, or reflective material.

In some aspects, the techniques described herein relate to an array, wherein the baffle element includes a metal.

In some aspects, the techniques described herein relate to an array, wherein the baffle element is disposed adjacent to the upper light-directing element.

In some aspects, the techniques described herein relate to an array, wherein the baffle element is disposed adjacent to the lower light-directing element.

In some aspects, the techniques described herein relate to an array, wherein each device further includes a laser-rejection filter within a baffle element layer.

In some aspects, the techniques described herein relate to an array, wherein each device further includes a diffractive optical element disposed between the lower light-directing element and the detector layer.

In some aspects, the techniques described herein relate to an array, wherein the diffractive optical element is a Fresnel lens.

In some aspects, the techniques described herein relate to an array, further including: an aperture layer disposed between the excitation source and the detector layer.

In some aspects, the techniques described herein relate to an array, wherein the aperture layer is disposed between the excitation source and the upper light-directing element.

In some aspects, the techniques described herein relate to an array, wherein the aperture layer is disposed between the upper light-directing element and the detector layer.

In some aspects, the techniques described herein relate to an array, wherein the aperture layer includes titanium nitride.

In some aspects, the techniques described herein relate to an array, including at least two aperture layers disposed between the excitation source and the detector layer.

In some aspects, the techniques described herein relate to an array, including at least three aperture layers disposed between the excitation source and the detector layer.

In some aspects, the techniques described herein relate to an array, wherein the excitation source is a waveguide excitation source.

In some aspects, the techniques described herein relate to an array, wherein the nanoscale emission volume is aligned directly above the waveguide excitation source.

In some aspects, the techniques described herein relate to an array, including a plurality of waveguide excitation sources, optically coupled to a plurality of nanoscale emission volumes.

In some aspects, the techniques described herein relate to an array, wherein the plurality of waveguide excitation sources are oriented parallel to one another.

In some aspects, the techniques described herein relate to an array, wherein the plurality of nanoscale emission volumes are aligned directly above the plurality of waveguide excitation sources.

In some aspects, the techniques described herein relate to an array, wherein the plurality of nanoscale emission volumes are arranged in a regular grid pattern.

In some aspects, the techniques described herein relate to an array, wherein the plurality of nanoscale emission volumes are arranged in an offset grid pattern.

In some aspects, the techniques described herein relate to an array, wherein the detector layer is integral to the array.

In some aspects, the techniques described herein relate to an array, wherein the detector layer is not integral to the array.

In some aspects, the techniques described herein relate to an array, wherein the sensing region is rectangular.

In some aspects, the techniques described herein relate to an array, wherein the sensing region is square.

In some aspects, the techniques described herein relate to an array, wherein the detector layer is part of a CMOS sensor.

In some aspects, the techniques described herein relate to an array, further including an analyte disposed within the nanoscale emission volume.

In some aspects, the techniques described herein relate to an array, wherein the analyte includes a biological sample.

In some aspects, the techniques described herein relate to an array, wherein the biological sample includes a nucleic acid.

In some aspects, the techniques described herein relate to an array, wherein the biological sample includes a polymerase enzyme.

In some aspects, the techniques described herein relate to an array, wherein the array includes at least 1,000 nanoscale emission volumes.

In another aspect, the invention provides methods for producing the arrays of integrated analytical devices disclosed herein.

BRIEF DESCRIPTION OF THE DRAWINGS

FIGS. 4A-4G show alternative configurations of integrated analytical devices comprising various light-directing elements in the optical collection pathway to improve efficiency of optical collection and decrease background noise.

FIGS. 6A-6E show design features of exemplary integrated analytical devices having reduced scale.

FIGS. 7A-7E illustrate representative design features of exemplary lower light-directing elements of the disclosed reduced-scale unit cells.

DETAILED DESCRIPTION OF THE INVENTION

Integrated Analytical Devices

Multiplexed optical analytical systems are used in a wide variety of different applications. Such applications can include the analysis of single molecules, and can involve observing, for example, single biomolecules in real time as they carry out reactions. For ease of discussion, such multiplexed systems are discussed herein in terms of a preferred application: the analysis of nucleic acid sequence information, and particularly, single molecule nucleic acid sequence analysis. Although described in terms of a particular application, it should be appreciated that the applications for the devices and systems described herein are of broader application.

In the context of nucleic acid sequencing analyses, a single immobilized nucleic acid synthesis complex, comprising a polymerase enzyme, a template nucleic acid, whose sequence one is attempting to elucidate, and a primer sequence that is complementary to a portion of the template sequence, can be monitored in order to identify individual nucleotides as they are incorporated into the extended primer sequence. Incorporation is typically monitored by observing an optically detectable label on an added nucleotide, prior to, during, or following its incorporation. These single molecule primer extension reactions can be monitored in real-time, to identify the continued incorporation of nucleotides in the extension product and thus to elucidate the underlying template sequence. The process can also be referred to as single molecule real time (or SMRT™) sequencing.

In preferred aspects, the immobilized template/polymerase primer complex is provided within an optically confined region, such as a zero mode waveguide (ZMW), or proximal to the surface of a transparent substrate, optical waveguide, or the like (see e.g., U.S. Pat. Nos. 6,917,726, and 7,170,50 and U.S. Patent Application Publication No. 2007/0134128, the full disclosures of which are hereby incorporated by reference herein in their entirety for all purposes). The optically confined region is illuminated with an appropriate excitation radiation for the fluorescently labeled nucleotides that are to be used. Because the complex is within an optically confined region, or very small illumination volume, only the reaction volume immediately surrounding the complex is subjected to the excitation radiation. Accordingly, those fluorescently labeled nucleotides that are interacting with the complex, e.g., during an incorporation event, are present within the illumination volume for a sufficient time to identify them as having been incorporated. Although the analyte of interest in the devices disclosed herein is a template/polymerase primer complex that is incorporating fluorescently-labeled nucleotides, it should be understood that other analytes of interest, in particular fluorescent analytes of interest, can be monitored using the arrayed devices of the instant disclosure.

Figure 1A:
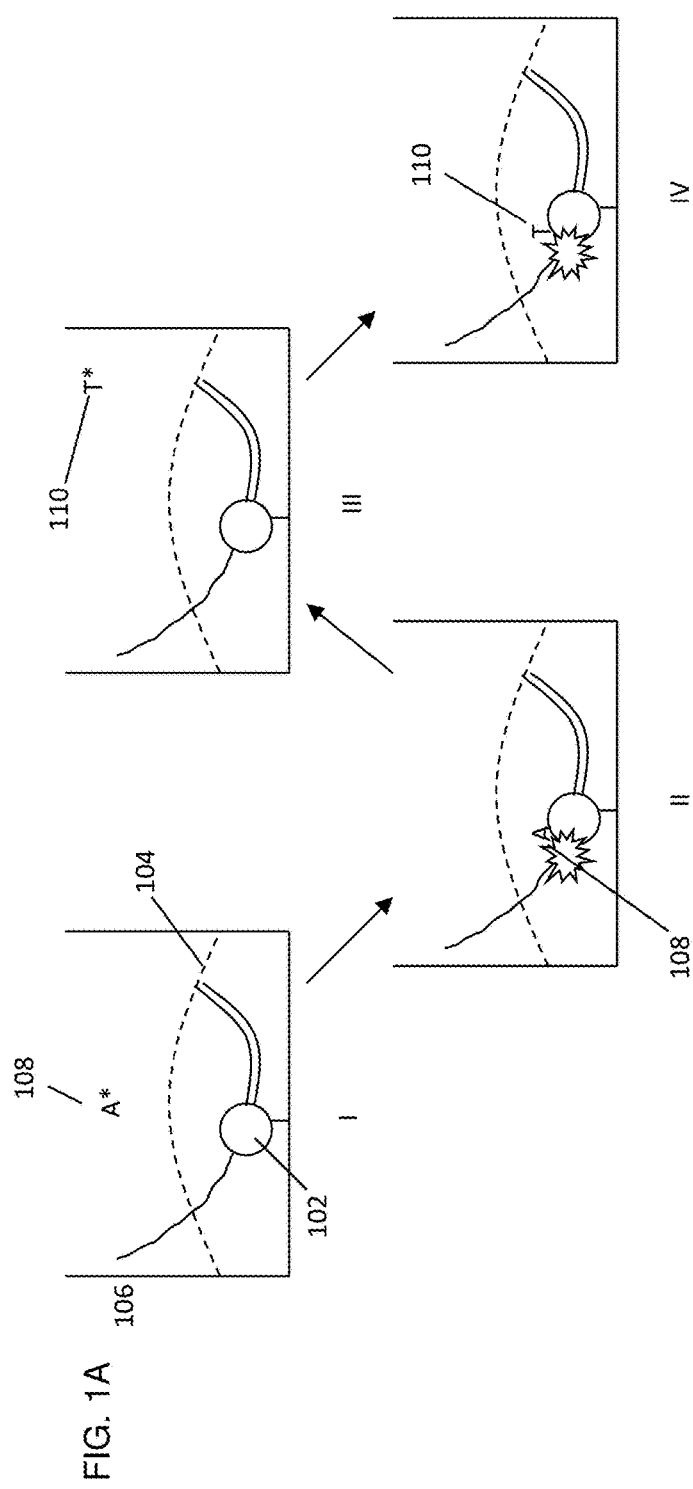
FIGS. 1A-1B schematically illustrate an exemplary nucleic acid sequencing process that can be carried out using the disclosed arrays of integrated analytical devices.
Figure 1B:
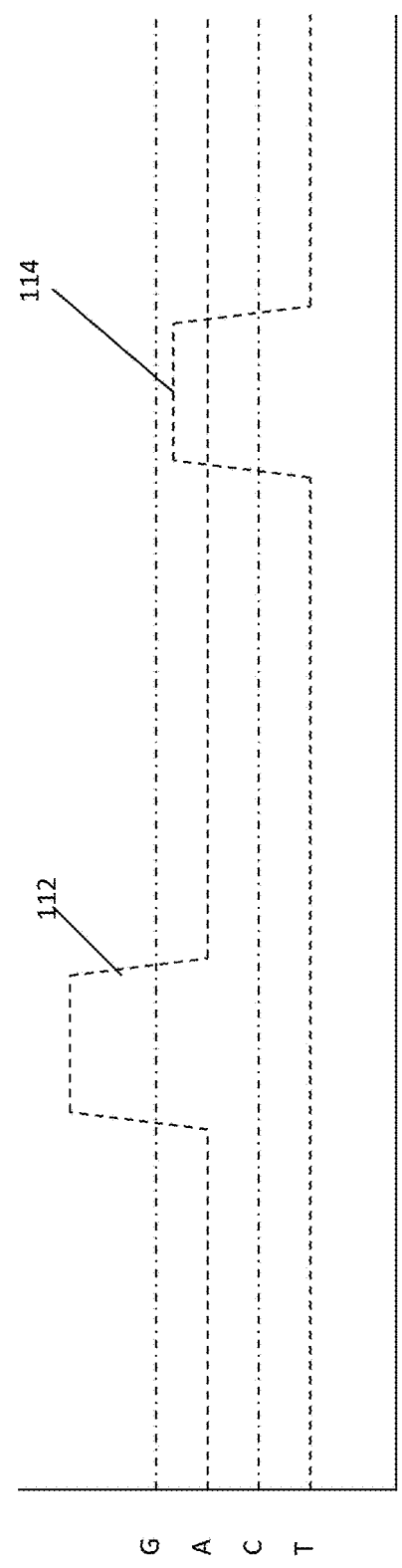

A schematic illustration of the just-described sequencing process is illustrated in FIGS. 1A and 1B. As shown in FIG. 1A, an immobilized complex 102 of a polymerase enzyme, a template nucleic acid and a primer sequence are provided within an observation volume (as shown by dashed line 104) of an optical confinement, of e.g., a zero mode waveguide 106. As an appropriate nucleotide analog, e.g., nucleotide 108, is incorporated into the nascent nucleic acid strand, it is illuminated for an extended period of time corresponding to the retention time of the labeled nucleotide analog within the observation volume during incorporation which produces a signal associated with that retention, e.g., signal pulse 112 as shown by the A trace in FIG. 1B. Once incorporated, the label that was attached to the polyphosphate component of the labeled nucleotide analog, is released. When the next appropriate nucleotide analog, e.g., nucleotide 110, is contacted with the complex, it too is incorporated, giving rise to a corresponding signal 114 in the T trace of FIG. 1B. By monitoring the incorporation of bases into the nascent strand, as dictated by the underlying complementarity of the template sequence, long stretches of sequence information of the template can be obtained.

The above sequencing reaction can be incorporated into an array of devices, typically an array of integrated analytical devices, that provides for the simultaneous observation of multiple sequencing reactions, ideally in real time. While the components of each device and the configuration of the devices in the system can vary, each integrated analytical device typically comprises, at least in part, the general structure shown as a block diagram in FIG. 2. As shown, an integrated analytical device 200 typically includes a reaction cell 202, in which the analyte (i.e., the polymerase-template complex and associated fluorescent reactants) is disposed and from which the optical signals emanate. The analysis system further includes a detector element 220, which is disposed in optical communication with the reaction cell 202. Optical communication between the reaction cell 202 and the detector element 220 is provided by an optical train 204 comprised of one or more optical elements generally designated 206, 208, 210 and 212 for efficiently directing the signal from the reaction cell 202 to the detector 220. These optical elements generally comprise any number of elements, such as lenses, filters, gratings, mirrors, prisms, refractive material, apertures, or the like, or various combinations of these, depending upon the specifics of the application. By integrating these elements into a single device architecture, the efficiency of the optical coupling between the reaction cell and the detector is improved. Examples of integrated analytical systems, including various approaches for illuminating the reaction cell and detecting optical signals emitted from the reaction cell, are described in U.S. Patent Application Publication Nos. 2012/0014837, 2012/0019828, and 2012/0021525, which are each incorporated by reference herein in their entireties for all purposes. Additional examples of integrated analytical systems, including systems comprising arrayed integrated analytical devices with highly efficient lens elements for the spatial separation and beam shaping of emission signals, are described in U.S. Patent Application Publication No. 2016/0061740, which is incorporated by reference herein in its entirety for all purposes. More specific examples of optical trains optimized for reduced-size integrated devices will be described in detail below.

Figure 2:
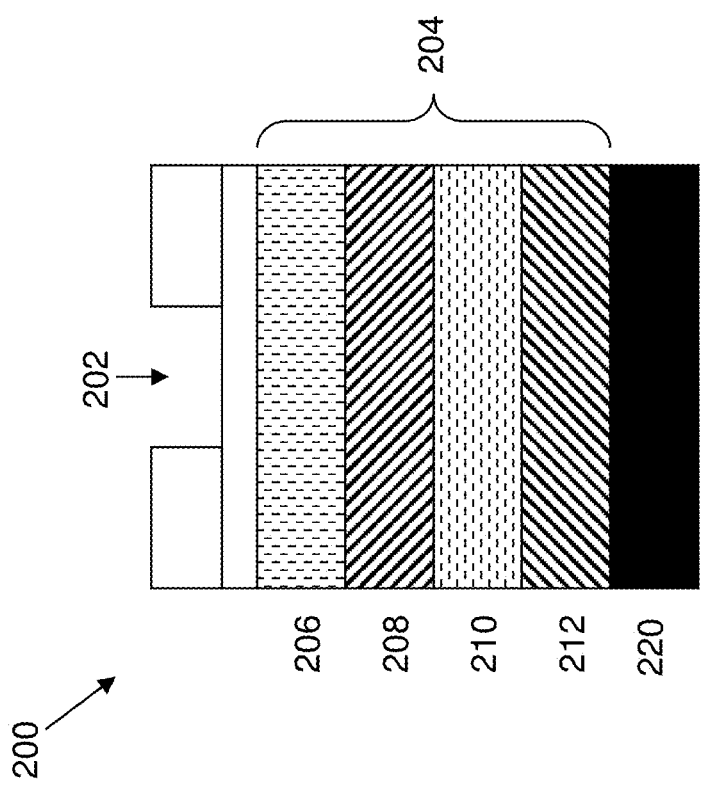
FIG. 2 provides a schematic block diagram of an integrated analytical device.

As noted above, an analyte (e.g., a polymerase-template complex with associated fluorescent reactants) disposed within a reaction cell (e.g., element 202 in FIG. 2) or otherwise immobilized on the surface of the device, emits light that is transmitted to a detector element (e.g., element 220 in FIG. 2). For fluorescent analytes, the analyte is illuminated by an excitation light source, whereas for other analytes, such as chemilunimescent or other such analytes, an excitation light source may not be necessary. At least a portion of the reaction cell volume, the emission volume, is optically coupled to the detector element, so that light emitted from an analyte within this volume, for example from a plurality of optical emitters within this volume, is measured by the detector element. In order to maximize the number of analytes measured simultaneously, the size of the instant analytical devices is reduced as much as possible, so that the emission volume within each device is a nanoscale emission volume. Ideally, the optical coupling between the nanoscale emission volume and the detector element is highly efficient, in order to maximize the sensitivity of the device and maximize the signal output. Also important is the minimization of cross-talk between unit cells in an arrayed analytical system and the minimization of background noise caused by scattered or otherwise interfering optical energy from an excitation source, for example an excitation waveguide source.

Conventional analytical systems typically measure multiple spectrally distinct signals or signal events and must therefore utilize complex optical systems to separate and distinctly detect those different signal events. The optical path of an integrated device can be simplified, however, by a reduction in the amount or number of spectrally distinguishable signals that are detected. Such a reduction is ideally effected, however, without reducing the number of distinct reaction events that can be detected. For example, in an analytical system that distinguishes four different reactions based upon four different detectable signal events, where a typical system would assign a different signal spectrum to each different reaction, and thereby detect and distinguish each signal event, in an alternative approach, four different signal events would be represented by fewer than four different signal spectra, and would, instead, rely, at least in part, on other non-spectral distinctions between the signal events.

For example, a sequencing operation that would conventionally employ four spectrally distinguishable signals, e.g., a "four-color" sequencing system, in order to identify and characterize the incorporation of each of the four different nucleotides, could, in the context of an alternative configuration, employ a one-color or two-color analysis, e.g., relying upon a signals having only one or two distinct or distinguished spectral signals. However, in such an alternative configuration, this reduction in reliance on signal spectral complexity does not come at the expense of the ability to distinguish signals from multiple, i.e., a larger number of different signal producing reaction events.

In particular, instead of relying solely on signal spectrum to distinguish reaction events, such an alternative configuration can rely upon one or more signal characteristics other than emission spectrum, including, for example, signal intensity, excitation spectrum, or both, to distinguish signal events from each other.

In one particular alternative configuration, the optical paths in an integrated analytical device can thus be simplified by utilizing signal intensity as a distinguishing feature between two or more signal events. In its simplest iteration, and with reference to an exemplary sequencing process, two different nucleotides would bear fluorescent labels that each emit fluorescence under the same excitation illumination, i.e., having the same or substantially overlapping spectral band, and thus would provide benefits of being excited using a single excitation source. The resulting signals from each fluorescent label would have distinct signal intensities or amplitudes under that same illumination, and would therefore be distinguishable by their respective signal amplitudes. These two signals could have partially or entirely overlapping emission spectra, but separation of the signals based upon any difference in emission spectrum would be unnecessary. Even more usefully, four different nucleotides bearing fluorescent labels that each emit fluorescence under the same excitation illumination but having distinguishable emission intensities in response to that illumination can be distinguished by their respective signal amplitudes.

Accordingly, for analytical systems using two or more signal events that differ in signal amplitude, the integrated analytical devices of such systems can readily benefit through the removal of some or all of those components that would normally be used to separate spectrally distinct signals, such as multiple excitation sources and their associated optical trains, as well as the color separation optics, e.g., filters and dichroics, for the signal events, which in many cases, requires at least partially separate optical trains and detectors for each spectrally distinct signal. As a result, the optical paths for these integrated analytical devices are greatly simplified, allowing placement of detector elements in closer proximity to reaction cells, and improving overall performance of the detection process for these devices.

Provision of a signal-producing analyte that will produce different signal amplitudes under a particular excitation illumination profile can be accomplished in a number of ways. For example, different fluorescent labels can be used that present excitation spectral profiles that overlap but include different maxima. As such, excitation at a narrow wavelength will typically give rise to differing signal intensities for each fluorescent group. As will be appreciated, this same approach can be used with more than two label groups, where the resulting emission at a given excitation spectrum have distinguishable intensities or amplitudes.

Similarly, two different fluorescent labeling groups can have the same or substantially similar excitation spectra but provide different and distinguishable signal emission intensities due to the quantum yield of those labeling groups. Further, although described in terms of two distinct fluorescent dyes, it will be appreciated that each different labeling group can each include multiple labeling molecules. For example, each reactant can include an energy transfer dye pair that yields emissions of differing intensities upon excitation with a single illumination source. For example, a labeling group can include a donor fluorophore that is excited at a given excitation wavelength, and an acceptor fluorophore that is excited at the emission wavelength of the donor, resulting in energy transfer to the acceptor. By using different acceptors, whose excitation spectra overlap the emission spectrum of the donor to differing degrees, such an approach can produce overall labeling groups that emit at different signal amplitudes for a given excitation wavelength and level. Likewise, adjusting the energy transfer efficiency between the donor and acceptor will likewise result in differing signal intensities at a given excitation illumination.

Alternatively, different signal amplitudes can be provided by different multiples of signal producing label groups on a given reactant, e.g., putting a single label molecule on one reactant while putting 2, 3, 4, or more individual label molecules on a different reactant. The resulting emitted signal will be reflective of the number of labels present on a reactant and thus will be indicative of the identity of that reactant.

Exemplary compositions and methods relating to fluorescent reagents, such as nucleotide analogs, useful for the above purposes are described in, for example, U.S. Patent Application Publication Nos. 2012/0058473; 2012/0077189; 2012/0052506; 2012/0058469; 2012/0058482; 2010/0255488; 2009/0208957, which is each incorporated by reference herein in its entirety for all purposes.

Accordingly, in preferred embodiments, the arrays of integrated analytical devices of the instant disclosure do not distinguish optical signals by color. In these embodiments, the devices therefore preferably do not include a color filtration element in their collection pathway, and each device preferably comprises a single sensing region, more specifically a single pixel, in a detector layer. Furthermore, in preferred embodiments, the integrated analytical devices of the instant arrays do not spatially separate an emission signal into more than one optical beam in the collection pathway.

As described above, integrated analytical devices making use of such approaches can see a reduction in complexity by elimination of spectral discrimination requirements, e.g., using signal amplitude or other non-spectral characteristics as a basis for signal discrimination. As shown in the block diagram of FIG. 2, an integrated analytical device 200 can include a reaction cell 202 that is defined upon the surface layer of the device. As shown in this drawing, the reaction cell comprises a nanowell disposed in the surface layer. Such nanowells can constitute depressions in a substrate surface or apertures disposed through additional substrate layers to an underlying transparent substrate, e.g., as used in zero mode waveguide (ZMW) arrays (see, e.g., U.S. Pat. Nos. 7,181,122 and 7,907,800, and also below). It should also be understood, however, that in some embodiments, the sample of interest can be confined in other ways, and that the nanoscale reaction cell in those embodiments can be omitted from the analytical devices. For example, if a target of interest is immobilized in a pattern on the surface of a device lacking separate reaction cells, binding events, or other events of interest, could be observed at those locations without the need for physical separation of the samples. Hybridization reactions, for example between immobilized nucleic acids and their complimentary sequences, or binding reactions, for example between antibodies and their ligands, where either member of the binding pair can be immobilized at a particular location on the surface of the device, could suitably be monitored using such an approach, as would be understood by those of ordinary skill in the art.

Excitation illumination is delivered to the reaction cell or to the immobilized target from an excitation source (not shown) that can be separate from or also integrated into the substrate. For example, in the block diagram of FIG. 2, an optical waveguide (or waveguide layer) below the reaction cell 202 can be used to convey excitation light to the reaction cell or otherwise immobilized target, where the evanescent field emanating from the waveguide illuminates reactants within the illumination volume. Use of optical waveguides to illuminate reaction cells is described in e.g., U.S. Pat. No. 7,820,983 and U.S. Patent Application Publication No. 2012/0085894, which are each incorporated by reference herein in their entireties for all purposes. The nanoscale reaction cell (also referred to herein as the "nanowell" or "ZMW") can act to enhance the emission of fluorescence downward into the device and limit the amount of light scattered upwards. The emitted light, whether from a nanoscale reaction cell or from an immobilized target, is directed to the detector through an integrated optical train comprising one or more optical elements, as will be described in more detail below.

It should be understood in the context of the disclosure that the "optical coupling" of two components in a device is not intended to imply a directionality to the coupling. In other words, since the transmission of optical energy through an optical device is fully reversible, the optical coupling of a first component to a second component should be considered equivalent to the optical coupling of the second component to the first component.

Emitted signals from the reaction cell 202 that impinge on a sensing region of the detector layer 220 are then detected and recorded. The sensing region can correspond to a pixel or pixels in an array detector, for example a CMOS detector.

The detector layer is operably coupled to an appropriate circuitry, typically integrated into the substrate, for providing a signal response to a processor that is optionally included integrated within the same device structure or is separate from but electronically coupled to the detector layer and associated circuitry. Examples of types of circuitry are described in U.S. Patent Application Publication No. 2012/0019828.

As will be appreciated from the foregoing disclosure, the integrated analytical devices described herein do not require the more complicated optical paths that are necessary in systems utilizing conventional four-color optics, obviating in some cases the need for excessive signal separation optics, dichroics, prisms, or filter layers. The scale of the devices can accordingly be reduced in order to accommodate an even higher level of multiplex in an array of integrated devices.

Improved Optical Collection Paths in Integrated Analytical Devices with Reduced Scale As should be understood from the above description, as unit cell dimensions of an integrated optical device shrink, the optical elements in the collection path (e.g., the optical train of FIG. 2) are preferably reduced in size as well. Up to a lower lateral dimension limit of about 2 μm, the unit cell design can be shrunk down roughly by cropping the lens element (while keeping the numerical aperture constant) and shrinking the vertical dimensions of the unit cell (i.e. object and image distances). However, as lateral dimensions of the unit cell become smaller than about 2 μm, the cropped lens, for example a cropped Fresnel lens, can quickly lose its efficiency, and the fraction of the optical signal that is transmitted to the sensor can diminish.

Figure 3B:
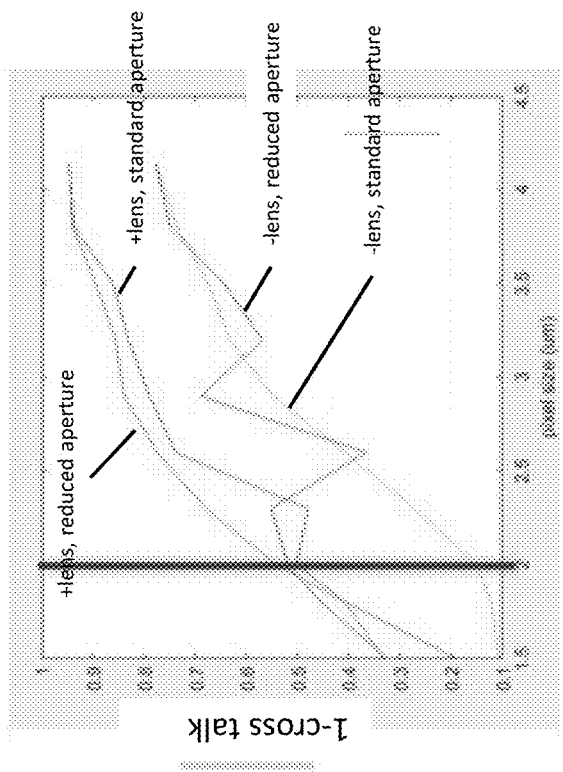
FIGS. 3A-3B demonstrate the effects of a unit cell's lateral dimension on the signal-to-noise ratio and cross-talk between unit cells within an array of integrated analytical devices.
Figure 3A:
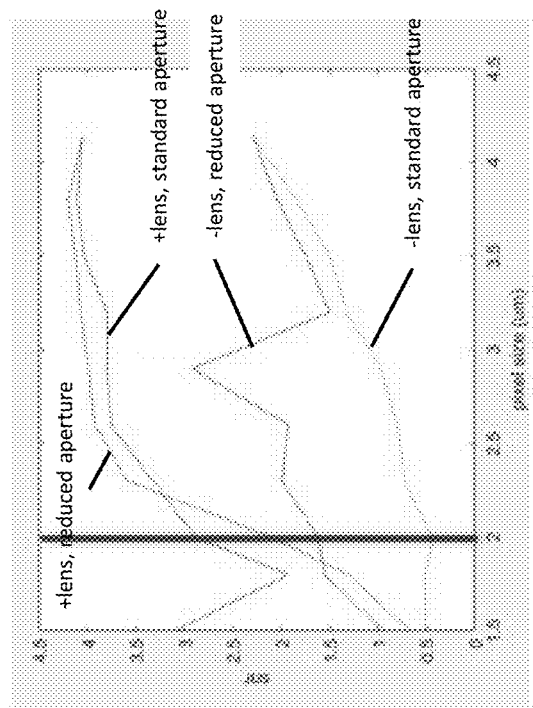

For example, FIGS. 3A and 3B show the effect of lateral unit cell dimension (represented as detector "pixel size") on the signal-to-noise ratio (FIG. 3A) and cell-to-cell cross-talk (FIG. 3B) in various simulations. Specifically, the benchmarking results shown in these figures was performed using a known unit-cell design (see, e.g., U.S. Patent Application Publication No. 2016/0061740) and making modifications to the lens and aperture opening sizes for comparison. The curves labeled "+lens, standard aperture" depict the signal to noise ratio (SNR) (FIG. 3A) and cell-to-cell crosstalk (FIG. 3B) of an exemplary previous design as the pixel size is reduced. Reduction in pixel size results in clipping of the sides of the lens in each device. The aperture openings are not changed in this simulation.

Similarly, the curves labeled "+lens, reduced aperture" simulate the effects on SNR and crosstalk as a function of lateral pixel size in a unit-cell design having a clipped lens and aperture openings that are reduced in size proportionally to the pixel size compared to the previous unit cell design.

The curves labeled "−lens, standard aperture" simulate the unit cell without the presence of a lens, thereby flooding the sensor with incident light. The aperture openings are not changed in this model compared to the previous design.

Finally, the curves labeled "−lens, reduced aperture" simulate the unit cell without the presence of the lens but with aperture openings reduced in size proportionally to the pixel size compared to the previous design.

To remedy the reduced collection path efficiency and increased cross-talk between unit cells, additional optical elements and adaptations can be introduced into the optical stack. By the appropriate design and combination of such optical elements, the collection efficiency of the optical stack can be increased, while also maintaining a high signal-to-noise ratio. The improved performance can include both mitigation of noise from scattered excitation light and modulation of crosstalk between unit cells.

As just mentioned, cropping the lens element of an integrated device as the lateral dimensions of the device unit cell are reduced, in particular as they are reduced below about 2 µm, can result in a reduced efficiency of optical transmission. Specifically, and for a given wavelength of light, cropping the lens while keeping the location of the object and the image unchanged can result in a smaller numerical aperture and a less focused image. These effects, in turn, can lead to a loss in collection efficiency and an increase in crosstalk, as stray light escapes from the integrated device and is captured by the sensor regions of adjacent devices.

To help guide the emitted light to the sensor with maximal efficiency and minimal cross-talk and background noise, the single lens element of prior integrated devices can be replaced with a novel "light-gathering structure" that is positioned between the emission volume and the detector layer of the unit cell and in relatively close proximity to each. Specifically, the light-gathering structure can be designed and fabricated such that the transmission of optical energy emanating from the emission volume of the unit cell to the detector layer is optimized. The light-gathering structure typically includes at least two features—an upper light-directing element and a lower light-directing element. Each of these features is typically fabricated from a material of high refractive index surrounded by a material of low refractive index, where the material of high refractive index provides an optical pathway for the transmitted light to pass through the light-gathering structure to the detector layer.

The upper light-directing element of the instant light-gathering structures typically has a downward-facing curved or stepped shape that is designed to bend light towards the detector layer, while the lower light-directing element has at least one cylindrical, upward-facing cone-shaped structure, or other suitable geometric shape, that is designed to capture light emitted from the upper light-directing element and to transmit that light to the sensor region in the detector layer with high efficiency and minimum cross-talk. As mentioned above, the upper light-directing element is typically in close proximity to the emission volume, and lower light-directing element is typically in close proximity to the sensing region in the detector layer. The relatively small overall vertical spacing between the emission volume, the light-gathering structure (comprising at least an upper light-directing element and a lower light-directing element), and the sensing region, thus distinguishes these novel devices from larger prior-art devices (i.e., devices with unit cell sizes greater than about 2.5 µm), where the light transmitted over larger distances, and through more traditional lenses and apertures, is understood to behave according to more traditional ray optics.

Accordingly, in some embodiments, the upper light-directing element is a diffractive optical element (DOE), for example a diffractive Fresnel element.

In embodiments, the distance between the nanoscale emission volume and the upper light-directing element is no more than about 5 µm, about 4 µm, about 3 µm, about 2 µm, about 1 µm, or even less.

In embodiments, the distance between the lower light-directing element and the sensing region is no more than about 5 µm, about 4 µm, about 3 µm, about 2 µm, about 1 µm, or even less.

As mentioned above, the lower light-directing element can include one or more cylindrical or upward-facing cone-shaped, or truncated cone-shaped, structures that are designed to guide and confine light within the unit cell and to prevent leakage into surrounding cells. Without intending to be bound by theory, this confinement is understood to result from the total internal reflection ("TIR") of transmitted light at the interface between the high-refractive index and low-refractive index materials. In particular, divergent optical energy entering the lower light-directing element can be directed to the detector layer by adjusting the sidewall angle of the lower light-directing element and/or by modulating the index contrast of the lower light-directing element and its surrounding material. The design space for this feature can be searched and optimized with the aid of models and simulations tools, such as a Finite Difference Time Domain (FDTD)-based code, for example as provided by Lumerical.

The design of the lower light-directing elements disclosed herein differs from previous approaches in various ways. For example, although an upper light-directing element, particularly a diffractive optical element such as a diffractive Fresnel optical element is preferably part of the collection pathway in the instant integrated devices, the lower light-directing element does not itself necessarily include an image-forming lens, which would map each point in an object plane to a correlated distinct point in an image plane. In other previous approaches, a high index material is formed as a simple cylinder, rather than a cone shape with tapered sides, so that the angular pattern of light passing through the device is not significantly altered. Still other previous approaches for optical confinement relied on compound parabolic concentrators (CPCs), for example as used in solar cell applications and the like. Unlike the lower light-directing elements described herein, however, a conventional CPC does not include an entrance surface for incident optical rays, and there is typically a specific formula that describes the shape of the CPC in terms of its ability to concentrate light.

Accordingly, in some embodiments are provided arrays of analytical devices, each device comprising a nanoscale emission volume, an excitation source optically coupled to the nanoscale emission volume, a detector layer optically coupled to the nanoscale emission volume, an upper light-directing element disposed between the nanoscale emission volume and the detector layer, and a lower light-directing element disposed between the upper light-directing element and the detector layer, wherein an optical signal is emitted from the nanoscale emission volume, and wherein the upper light-directing element directs the optical signal from the nanoscale emission volume to the lower light-directing element, which in turn directs the optical signal to a sensing region in the detector layer.

In more specific embodiments, each device in the above array has a maximum lateral dimension of no more than about 3.0 µm, about 2.7 µm, about 2.5 µm, about 2.4 µm, about 2.3 µm, about 2.2 µm, about 2.1 µm, about 2.0 µm, about 1.9 µm, about 1.8 µm, about 1.7 µm, about 1.6 µm, about 1.5 µm, or even lower.

Exemplary designs for integrated analytical devices comprising the instant light-gathering structures are provided in FIGS. 4A-4D, where optical emission from the sample, including high-angle divergent optical beams, is illustrated as the arrows that emanate from emission volume 405 in each case. The optical emission from the sample passes through an upper light-directing element 450 prior to entering lower light-directing element 470 at an entry surface 476. The optical signal is directed through the lower light-directing element so as to optimize the total optical energy that passes through the lower light-directing element at an exit surface 478 (illustrated as short arrows) and ultimately reaches detector layer 490. The light-gathering structure (i.e., at least an upper light-directing element and a lower light-directing element) is thus configured to optimize transmission of an emission signal from the sample to the detector layer. This is achieved both by increasing signal capture and decreasing crosstalk and other background noise to the detector.

Figure 4A:
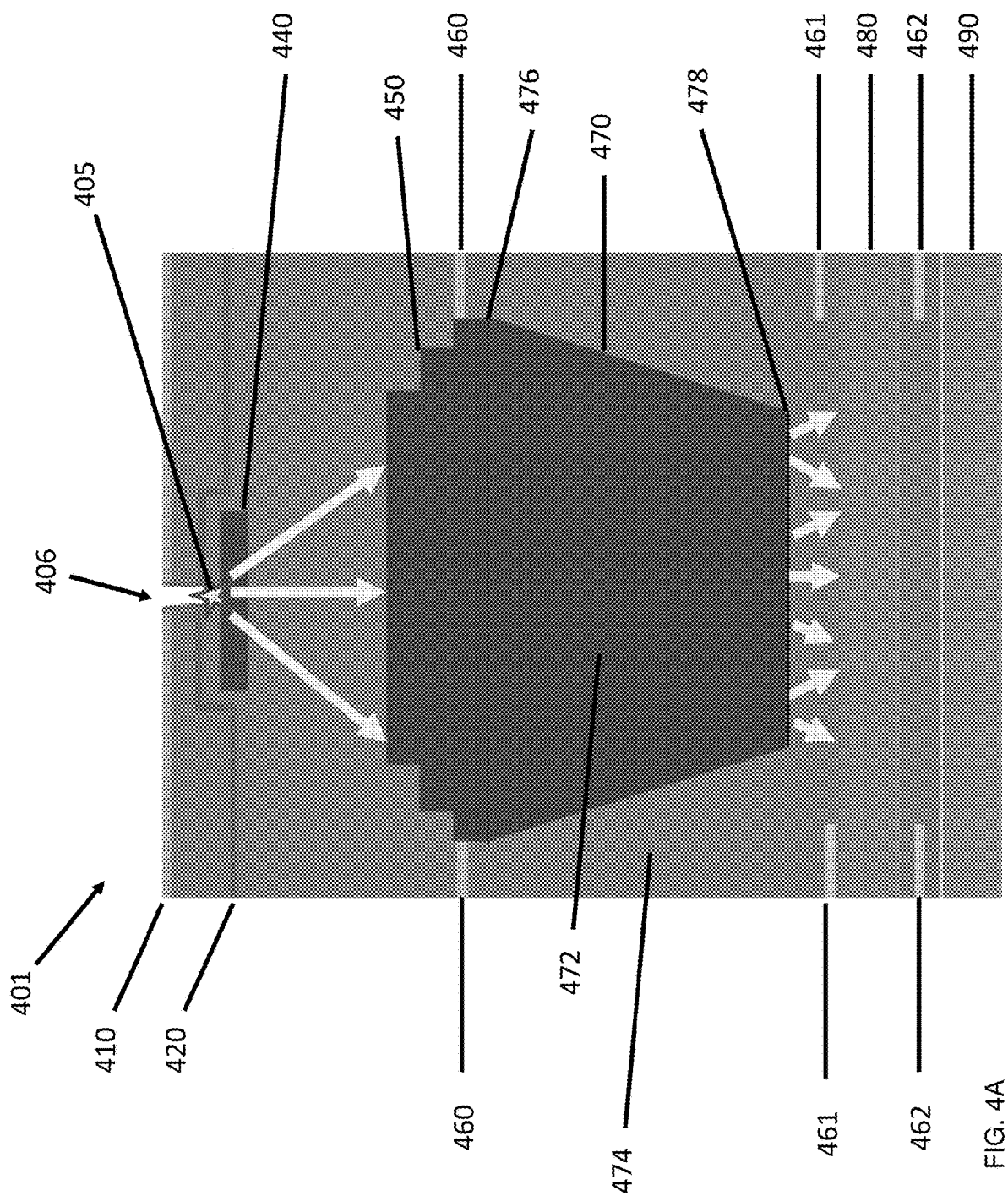

As described above, the lower light-directing elements of the instant disclosure, which may also be referred to as "light cones", "light pipes", or "optical tunnels", can comprise a core material having a relatively high refractive index (i.e., a "high-index core material") embedded in a cladding material having a relatively low refractive index (i.e., a "low-index cladding material"), for example as illustrated in the integrated analytical device 401 of FIG. 4A. In particular, the high-index core 472 of lower light-directing element 470 can act by confining the light within the high index volume by providing for a high reflectivity at the boundary between high index 472 and low index 474 materials, and thus by decreasing the angular spread of the transmitted light within the core of the lower light-directing element. The choice of suitable high-index and low-index materials is a design choice that would be understood by those of ordinary skill in the art.

More specifically, and as shown in FIG. 4A, excitation light is provided to analytes in a reaction cell 406 by an optical waveguide source 440. As light from the emission volume 405 (designated as a star) within the reaction cell passes through the upper light-directing element 450 into the lower light-directing element 470, any light rays intersecting the sidewalls of the light cone are largely reflected back into the lower light-directing element due to the large difference in index of refraction between the core material and the cladding surrounding it. As shown in FIG. 4A, the lower light-directing element can, for example, be fabricated in the shape of a truncated cone, with tapered sides and an entry surface 476 that is relatively larger than the exit surface 478. Details regarding the specific designs of the upper light-directing element and the lower light-directing element, including, for example, diameters, sidewall angles, core and cladding materials, and the like, can depend on material and design constraints, as would be understood by those of ordinary skill in the art. Specific design features will be provided in more detail below. Exemplary lower light-directing elements, which may be adapted for use in the instant integrated devices, have also been described, for example, in U.S. Patent Application Publication No. 2012/0019828, previously incorporated by reference.

Although the entry surface 476 and exit surface 478 are illustrated as planar surfaces in FIGS. 4A-4D, it should be understood that these surfaces can be formed in any suitable shape. For example, these surfaces can be curved or stepped, if desired. It should also be understood that, when viewed from above, these surfaces are preferably oval or circular in shape, but that other shapes could find utility in the instant lower light-directing elements. For example, the lower light-directing element can have a rectangular or square surface structure, which may be of particular advantage where the exit surface 478 is in close proximity to the sensing region of detector layer 490. The shape of the exit surface is preferably designed to match the shape of the pixel or pixels in the sensing region.

In some embodiments, the lower light-directing element can include a cylindrical light-directing element. A cylindrical light-directing element is understood to be a variation of a truncated cone, where the entrance and exit diameters are equal. With cylindrical elements, a larger diameter can increase the amount of signal capture but can also increase the cross-talk between adjacent cells and thus background noise. Smaller-diameter cylindrical light-directing elements can decrease background noise but at the expense of collected optical signal. The primary benefit of a cylindrical structure is in the ease of fabrication. Depending on the material, fabrication process, and etch chemistry, achieving straight side wall angles can significantly reduce process complexity and lower the side-wall angle variation otherwise expected with a cone-shaped light-directing element. In some embodiments, the lower light-directing element can have an oval pillar shape, a square pillar shape, or a rectangular pillar shape. The walls of a light-directing element having any of these pillar shapes can be untapered or tapered, as desired, and the entrance and exit surfaces can accordingly have equal or unequal surface areas. As just mentioned, lower light-directing elements with non-cylindrical pillar shape can have advantages with respect to their ease of fabrication.

Integrated analytical devices comprising a light-gathering structure can optionally comprise additional optical elements. For example, and as shown in FIG. 4A, a filter element, such as laser-rejection filter element 480, can be disposed between the lower light-directing element and a detector layer 490. The exemplary integrated analytical device 401 of FIG. 4A also includes a metallic layer 410, an etch stop layer 420, and aperture layers 460, 461, and 462, the details of which will be provided in a later section.

The core and cladding of the upper and lower light-directing elements of the instant devices can be formed from any suitable optical materials, as would be understood by those of ordinary skill in the art. In some embodiments, the upper and lower light-directing elements can be formed from different materials. In these embodiments, it can be advantageous, however, for the different core materials to be impedance matched, in order to avoid reflection at the interface. In preferred embodiments, the cores of the upper and lower light-directing elements are prepared from the same material.

In some embodiments, the upper and lower light-directing elements of an integrated analytical device can be advantageously separated from one another by another optical element, for example by a filter element. For example, FIG. 4B shows an alternative integrated analytical device 402 where the laser-rejection filter element 480 is disposed between the upper light-directing element 450 and the lower light-directing element 470. It should be understood that in any of these embodiments, the orientation of the upper light-directing element can advantageously be inverted from the design shown in FIGS. 4A-4D.

Figure 4C:
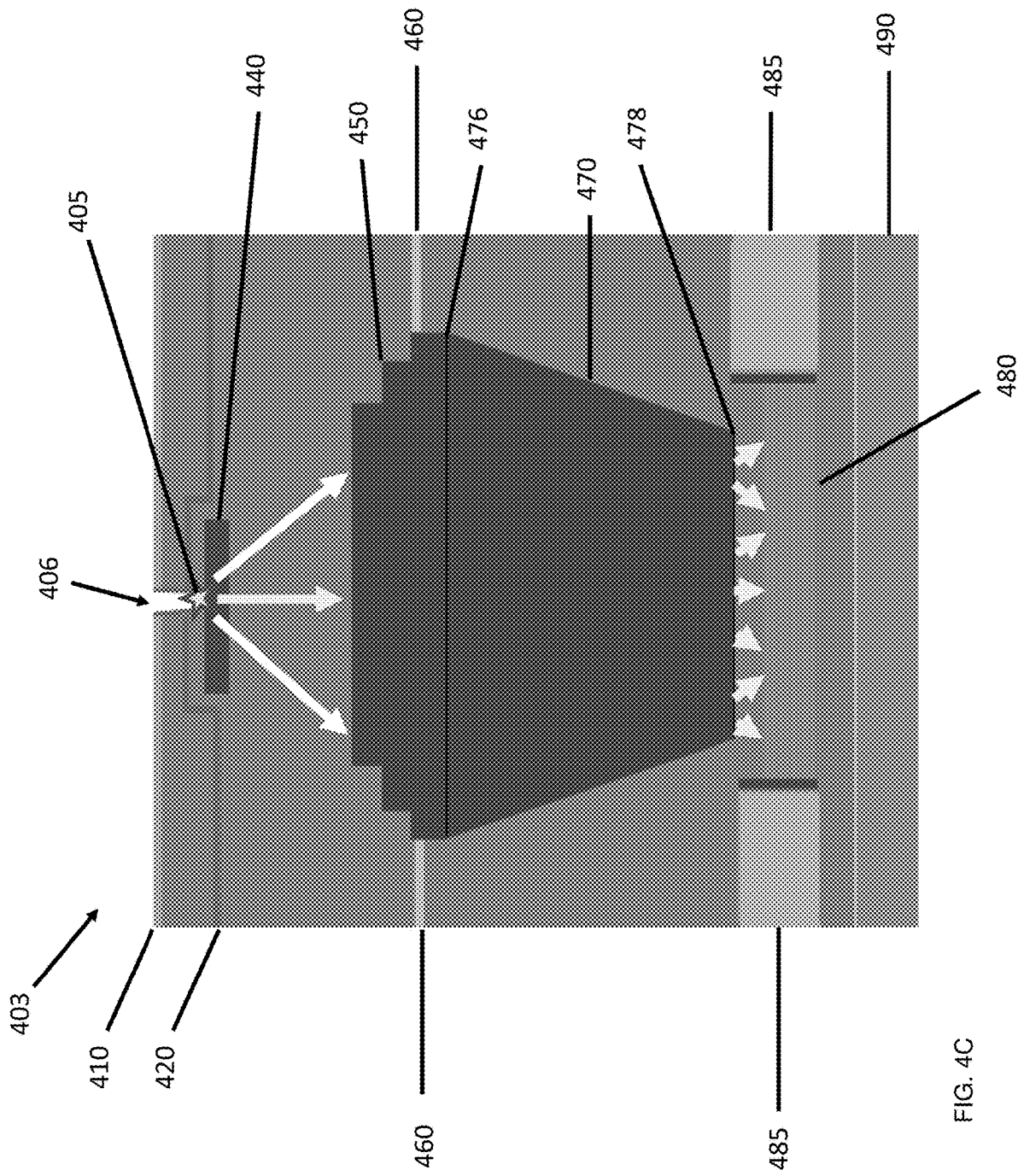
Figure 4D:
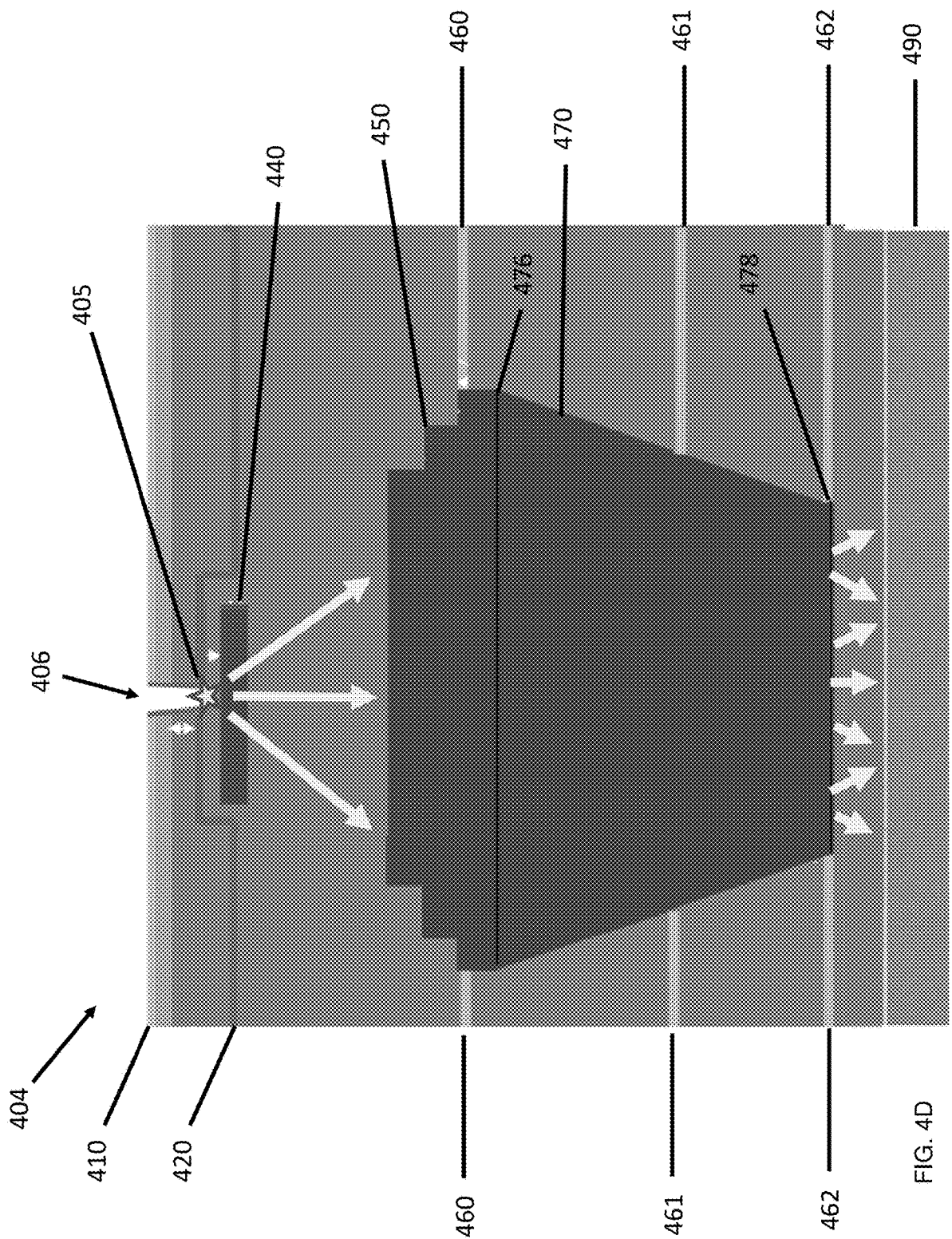

FIG. 4C shows yet another optional optical element that can be included in the collection path of an integrated analytical device having reduced-scale lateral dimensions and comprising an upper and lower light-directing element. Specifically, the integrated analytical device 403 of FIG. 4C includes a baffle element layer 485, where the baffle element layer is illustrated as a layer of opaque material between the cladding surrounding the lower light-directing element and the detector layer. In preferred embodiments, the opening within the baffle element layer comprises a laser-rejection filter, for example laser-rejection filter 480.

Specifically, in order to confine and collimate light in the collection path, the preferred path of the light can be physically blocked off or lined with an opaque, absorptive or reflective material. A trench can be etched between sections of adjacent unit cells and filled with metal (e.g. Al, W) or lined with an absorptive material (e.g. TiN). The baffle material can be limited to locations where the crosstalk between unit cells is highest, for example in sections of the unit cell with a high amount of diffraction (for example, where light leaves the upper light-directing element or the lower light-directing element). Baffle elements can additionally or alternatively be placed between unit cells, for example in the upper light-directing element layer, to limit light from one unit cell entering the lens of an adjacent cell, in the laser-rejection filter layer, and/or between the laser-refection filter layer and the detector layer, to intercept high-angle diffracted light exiting a lower light-directing element. Still additionally or alternatively, baffle elements can be placed in the layer between the emission volume and the upper light-directing element. In general, the baffle element is designed to collimate light diffracting from the lower light-directing element, or from other features of the unit cell, and to prevent excessive optical crosstalk between adjacent unit cells, for example by stray rays passing through the cladding surrounding the lower light-directing element. The baffle element can also block stray excitation (also referred to as "pump") light from the excitation source. As viewed from above the individual device, the opening in a baffle element can be circular, oval, rectangular, square, or any other suitable shape.

As would be understood by those of ordinary skill in the art, the laser-rejection filter element can add a significant amount of thickness to the overall vertical thickness of the optical stack, and hence to the overall aspect ratio of the unit cell. To reduce this aspect ratio and to improve optical crosstalk and collection efficiency, the laser-rejection filter stack can optionally be eliminated by providing an absorptive filter element within the collective light path that is configured to selectively absorb scattered excitation illumination and prevent this background signal from reaching the sensing regions. An exemplary device design including this feature is shown in integrated analytical device 404 of FIG. 4D, where the core of the lower light-directing element 470 comprises an absorptive material. The absorptive materials used in the lower light-directing element are preferably dielectrics, such as amorphous silicon or silicon nitride, similar to the preferable material choices for the core material of the upper light-directing element. In particular, the material is chosen to have a low absorption in the emission wavelength range of the fluorophore and a relatively higher absorption in the wavelength range of the excitation source. This choice ensures that the signal emission wavelength can pass through the collection path with little attenuation, while noise due to scattered light from the excitation source is suppressed. Examples of absorptive filter layers are also described below with respect to multilayer and hybrid laser-rejection filter designs.

Due to the required attenuation of the scattered excitation light (typically at least 5 orders of magnitude), it is preferable that little or no scattered excitation light can bypass the absorptive material. This can be achieved by the presence of at least one, ideally two or more opaque aperture layers that fit tightly around the absorptive material in a horizontal plane. The aperture elements of the instant disclosure are preferably fabricated from an absorptive material. Aperture elements 460, 461, and 462 are illustrated in the devices of FIGS. 4A-4D and will be described in more detail below.

As mentioned above, the upper light-directing element of the instant integrated devices can be a diffractive optical element, such as a Fresnel zone plate or lens. Such diffractive optical elements, and variants thereof, have been incorporated into advanced optical devices using various techniques, for example as imaging optics in illumination systems (see, e.g., U.S. Pat. No. 6,002,520), in light emitting devices (see, e.g., U.S. Pat. No. 1), in solid-state imaging devices (see, e.g, U.S. Pat. No. 7,499,094), in image sensors (see, e.g., U.S. Pat. No. 8,411,375), and in integrated infrared sensors (see, e.g., U.S. Patent Application Publication No. 2013/0043552).

Diffractive optical elements, such as Fresnel lenses, have also been used in arrays of integrated analytical devices for the purpose of spatial separation and beam shaping of optical emissions from an illumination volume, as described in U.S. Patent Application Publication No. 2016/0061740, previously incorporated by reference herein in its entirety. The design of the lens elements of the instant disclosure and their integration into the instant analytical device arrays can be achieved using analogous approaches. Such optical elements are readily manufactured using standard microchip fabrication techniques, for example using standard deposition, removal, and patterning techniques.

Figures 4E, 4F, 4G:
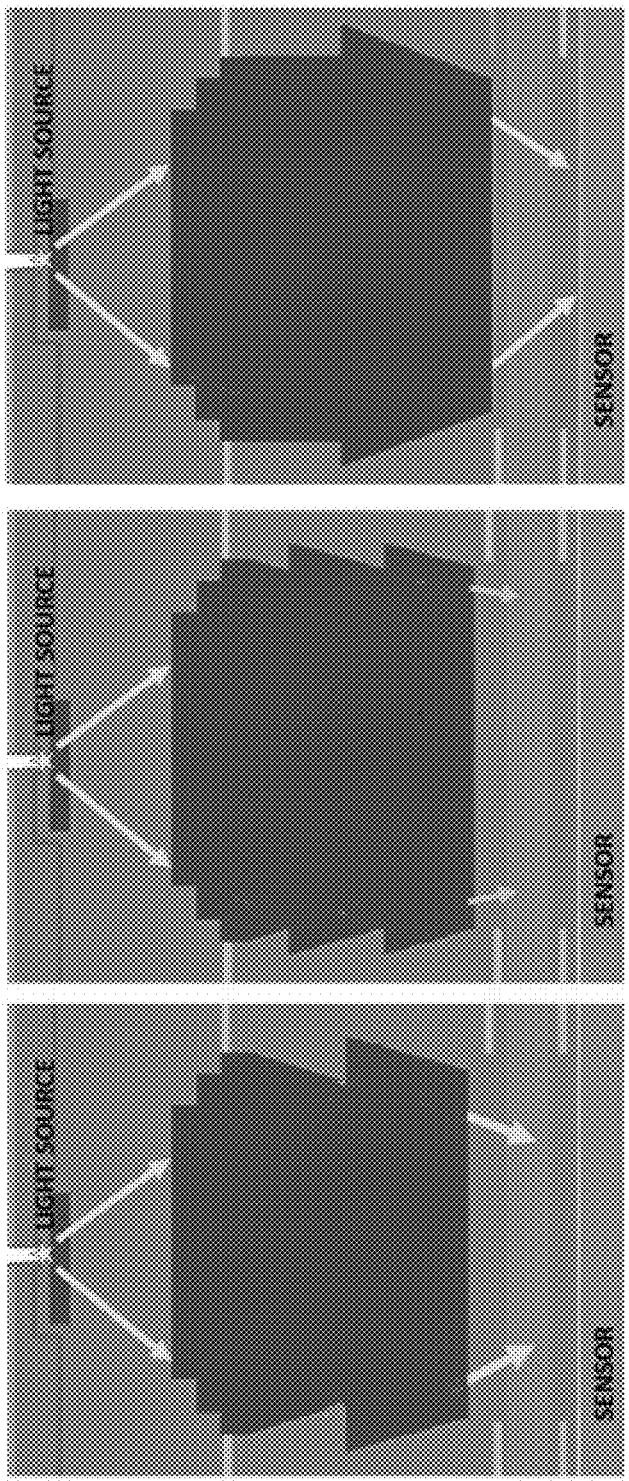

Depending on the fabrication process utilized in forming the above-described light-gathering structures, etching either the high index light-directing element cores or the low index cladding around the cores may be difficult if the aspect ratio of the light-directing elements is large. To avoid this possibility, two or more shallow cones can be stacked on top of one another to form an overall deeper lower light-directing element, where each individual shallow cone is fabricated in a separate step. The depth of the individual cones, their side-wall angles, as well as the entrance and exit diameters of each cone can be tuned to achieve optimal performance for the lower light-directing element. In addition, each cone within a given lower light-directing element can have its own specific dimensions, the different cones within a given lower light-directing element need not be identical. Exemplary devices with lower light-directing elements comprising stacked cones are illustrated in FIG. 4E (with two stacked cones) and 4F (with three stacked cones). In devices having stacked cones, it can in some cases be advantageous to include an additional "blanket" layer of absorptive material, for example a layer of a carbon-rich amorphous silicon material (CRAS) or the like, between the stacked cones.

The lower light-directing elements of the instant analytical devices can alternatively have hybrid configurations that include a combination of one or more cones with one or more cylinders. Such hybrid structures can help to overcome any possible difficulties in fabrication while meeting performance metrics. An exemplary device with a lower light-directing element having a hybrid structure comprising a cylindrical element stacked on a cone element is illustrated in FIG. 4G.

As previously noted, the inclusion of a rejection filter in an optical stack can make up a significant amount of the total vertical thickness of a unit cell stack. Reducing the total stack thickness can help keep light collimated and reduce optical crosstalk between adjacent cells. As also noted above, it can be advantageous to use a highly absorptive material in the core of a lower light-directing element, but such materials typically require at least a 2-3 μm thickness in order to provide absorption of scatter to decrease background noise. In some embodiments, the instant light-gathering structures may therefore include a "blanket layer" of lossy material deposited between the upper and lower light-directing elements. Other configurations could include a blanket layer within the lower light-directing element itself, for example in the waist of a cone, or at the exit of the lower light-directing element. As mentioned above, the lossy material used in fabrication of blanket layers can, for example, comprise a carbon-rich amorphous silicon material.

In yet other embodiments of the instant light-gathering structures, it may be advantageous to include an additional diffractive optical element below the lower light-directing element, in particular where there is increased spacing between the bottom of the light-gathering structure and the detector layer. For example, in some cases the sensors used to fabricate the instant arrays of small unit-cell optical devices may need to be planarized as part of the fabrication process. Such planarization layers, for example a layer of planarization oxide, can be as thick as 2 μm and can have variations as large as 500 nm. The thickness of, and variation in, the planarization layer can consequently result in increased cross-talk between cells if the optical signal exiting the lower light-directing element is not sufficiently collimated. The addition of a second diffractive optical element below the lower light-directing element can further collimate light as it exits the light-gathering structure and therefore reduce its divergence as it propagates through the oxide layer prior to reaching the sensor. The second diffractive optical element at the bottom of the light-gathering structure can have the same dimensions as the upper light-directing element or it can be optimized for performance with different dimensions.

Figure 5C:
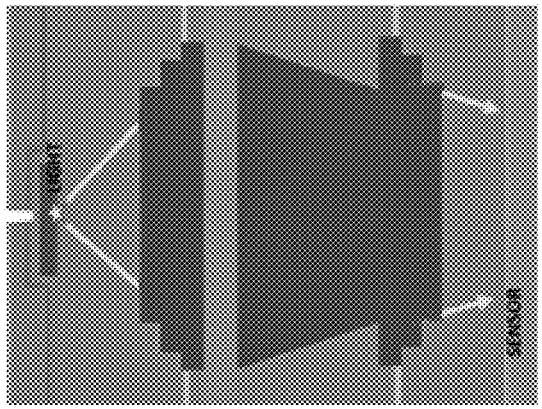
FIGS. 5A-5D illustrate additional alternative configurations of integrated analytical devices comprising additional diffractive optical elements.
Figure 5B:
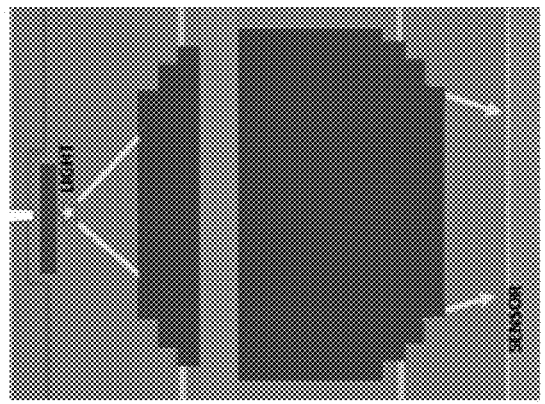
Figure 5A:
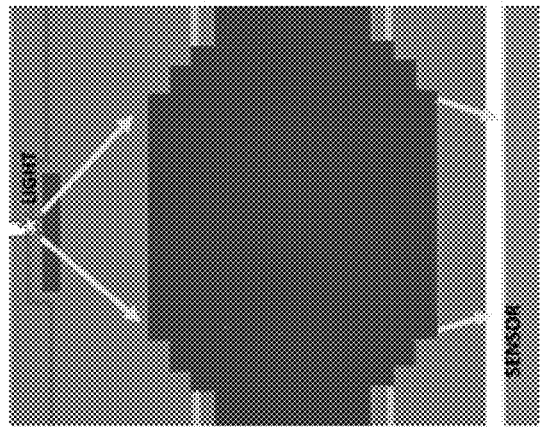

Light-gathering structures can therefore include, in some embodiments, a first diffractive optical element as the upper light-directing element, a lower light-directing element, and a second diffractive element below the lower light-directing element, wherein the three components are preferably fabricated from index-matched material. As just mentioned, the inclusion of the second diffractive element at the bottom of the light-gathering structure can at least partly collimate an optical signal as it passes through the optical stack. Exemplary optical devices comprising a second diffractive optical element are illustrated in FIGS. 5A-5C. In the exemplary device of FIG. 5A, the lower light-directing element includes a blanket high index layer. In the exemplary device of FIG. 5B, the lower light-directing element has a cylindrical shape, and a laser-rejection filter element is positioned between the upper light-directing element (a diffractive optical element) and the lower light-directing element. In the exemplary device of FIG. 5C, the lower light-directing element has a truncated cone shape, and a laser-rejection filter element is positioned between the upper light-directing element (a diffractive optical element) and the lower light-directing element.

Any of the above-described features can be combined in the design and fabrication of light-gathering structures in the instant small-scale unit-cell devices of the instant disclosure. For example, such devices can include one or more cones and/or one or more cylinders. They can include more than three stacked cones or several layers of blanket high index material, as desired. The configurations can also be in combination with absorptive materials where, instead of a blanket layer, the cones and/or cylinders of the light-gathering structures are fabricated from selectively absorptive materials.

Figure 5D:
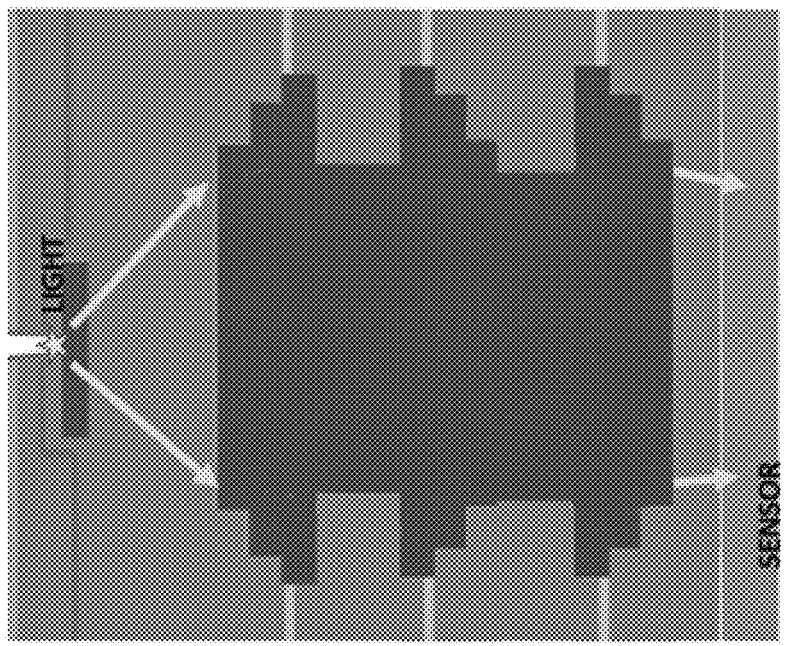

Configurations having a second diffractive optical element can also be extended to include a multi-element relay configuration, where multiple diffractive optical elements are employed to tailor the optical pathway within a device. In addition, each of the diffractive optical elements within a device can have varying dimensions and be configured in upward-facing or downward facing orientations, for example as illustrated in the light-gathering structure of FIG. 5D.

Additional exemplary small-scale optical devices, and exemplary dimensions of their design features are illustrated in FIGS. 6A-6E. In each case, the lateral dimension of each exemplary unit cell is 1.8 μm, and each exemplary unit cell includes a waveguide excitation source of 0.19 μm vertical thickness, an upper light-directing element that comprises a stepped diffractive optical element with 0.12 μm vertical thickness per step, and a vertical thickness of 0.56 μm between the waveguide source and the upper light-directing element. The device of FIG. 6A includes a single truncated cone as the lower light-directing element, where the truncated cone has an entrance diameter of 1.4 μm, an exit diameter of 1.0 μm, and a vertical dimension of from 1.5 to 3 μm. The device further includes a laser-rejection layer of 1.5 μm vertical thickness below the lower light-directing element, and a planarization oxide layer of 1.0 μm vertical thickness between the lower light-gathering element and the sensor layer.

The devices of FIGS. 6B and 6C are variants of the device of FIG. 6A with either one truncated cone (FIG. 6C) or two stacked truncated cones (FIG. 6B) as the lower light-directing element. Each cone has a vertical dimension of from 0.75 to 1.25 μm. The devices of FIGS. 6B and 6C further include a laser rejection filter layer of 1.5 μm vertical thickness between the upper light-directing element and the lower light-directing element.

The devices of FIGS. 6D and 6E are variants of the devices of FIGS. 6C and 6E, where the laser rejection filter layer is omitted, but the cones are fabricated from a material that selectively absorbs scattered excitation illumination and thus prevents this background signal from reaching the sensing regions.

Accordingly, each device in the instant arrays of integrated analytical devices can therefore have a maximum vertical dimension of no more than about 25 μm, about 20 μm, about 15 μm, about 10 μm, about 8 μm, about 6 μm, about 5 μm, about 4 μm, about 3 μm, or even less. Furthermore, each device can comprise a lower light-directing element with a maximum vertical dimension of no more than about 6 µm, about 5 µm, about 4 µm, about 3 µm, about 2 µm, about 1 µm, or even less. The lower light-directing element of each device can be one or more truncated cones and/or one or more cylinders. In some embodiments, the vertical dimension of each cone or cylinder layer is therefore no more than about 6 µm, about 5 µm, about 4 µm, about 3 µm, about 2 µm, about 1 µm, or even less.

Additional preferable design features of exemplary lower light-directing elements of the instant small unit cell devices are illustrated in FIGS. 7A-7E. These structures reflect lower light-directing elements having either a single truncated cone structure of 0.75 µm vertical thickness (FIGS. 7A, 7B, 7D, and 7E) or a hybrid structure with a cylinder stacked on a truncated cone and a 1.25-2.25 µm vertical thickness (FIG. 7C). In these structures, the side-wall angles of the truncated cones range from 75° (FIG. 7C) to 81° (FIGS. 7A and 7B) to 84° (FIGS. 7D and 7E), the entrance diameters range from 1.26 µm (FIG. 7E) to 1.34 µm (FIG. 7B) to 1.4 µm (FIGS. 7A, 7C, and 7D), and the exit diameters range from 1.1 µm (FIGS. 7B, 7C, and 7E) to 1.16 µm (FIG. 7A) to 1.24 µm (FIG. 7D). In some embodiments, the lower light-directing element does not include a truncated cone but is simply a cylindrical, square, rectangular or other suitably-shaped pillar of core material.

In some embodiments, the sidewall angle of a truncated cone of the lower light-directing element of the instant devices can therefore be from about 60° to about 90°, from about 70° to about 90°, from about 72° to about 85°, or even from about 75° to about 83°. In some embodiments, the sidewall angle of a truncated cone of the lower light-directing element of the instant devices can be about 75°, about 81°, or about 84°.

Figure 8A:
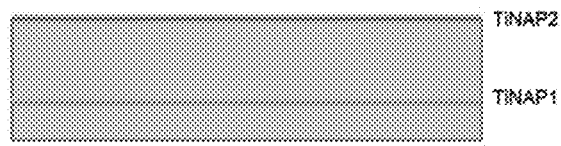
FIGS. 8A-8E illustrate exemplary methods for fabrication of the disclosed arrays of analytical devices.
Figure 8B:
Figure 8C:
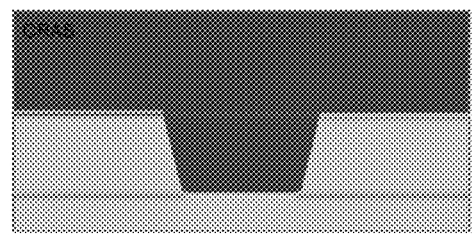
Figure 8D:
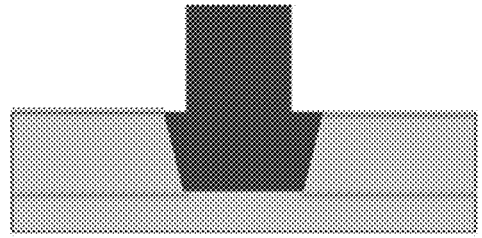
Figure 8E:
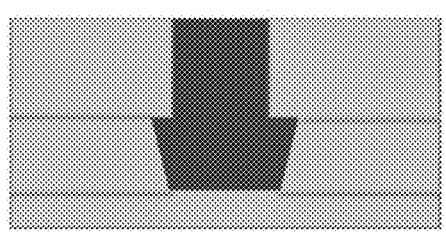

General methods for fabrication of the instant arrays of integrated analytical devices are described in detail below. A more specific exemplary process flow for fabrication of the lower light-directing element layer of an exemplary array is illustrated in FIGS. 8A-8E. Specifically, FIG. 8A shows the result of the deposition of films of 500 nm of an oxide layer, 100 nm of TiN, 750 nm of oxide, and 100 nm of TiN. The TiN layers provide the aperture layers of the unit cell, as will be described below. FIG. 8B shows the patterning of the TiNAP2 layer, using this layer as a hardmask to etch an oxide conical cavity below, and stopping on TiN. A subsequent open step removes the TiN layer to pattern the TiNAP1 layer. As shown in FIG. 8C, the core material of the cone (e.g., a carbon-rich amorphous silicon (CRAS) material) is deposited into the cavity and overfilled as required above the TiNAP2 layer. FIG. 8D shows the result of etching the CRAS to form cylindrical pillars. FIG. 8E shows the result of filling with an oxide layer between the CRAS pillars. The oxide surface can then be polished, and the fabrication can be continued with deposition of the requisite layers above the lower light-directing layer.

In alternative fabrication methods, a layer of core material can be layered onto an aperture layer (e.g., a TiNAP layer) that has already been patterned to open an array of suitably-shaped apertures. A tall (e.g., 2-3 µm) cylindrical, oval, square, rectangular, or other suitably-shaped pillar of core material can then be patterned and etched to form the array of lower light-directing elements. In these structures, it is understood that the sidewall angle of the lower light-directing elements can be about 90° or can be less than 90°.

In still other alternative fabrication methods, the TiNAP1 and TiNAP2 layers are patterned and etched independently of the lower light-directing element layer and do not necessarily serve as hardmask and/or etch stops for that layer.

Aperture Layers

As mentioned above, the integrated analytical devices of the instant disclosure can optionally include one or more aperture layers. The aperture layers are fabricated between or within other layers of the nanoscale analytical devices, for example between the ZMW/nanowell layer and the upper light-directing element layer, between the upper light-directing element layer and the lower light-directing element layer, between the lower light-directing element layer and the laser-rejection filter layer, and/or between the laser-rejection filter layer and the detector layer. The apertures provide openings to allow maximum transmission of emitted light from the ZMW/nanowell to the sensing regions of the detector element within a given unit cell, while at the same time minimizing background transmission of light, either from the excitation source (e.g., the waveguide), from autofluorescence within the device, or from cross-talk between adjacent unit cells. Aperture layers are typically constructed of light-blocking materials where transmission of light is undesirable and of transparent materials where transmission of light is desired. Suitable light-blocking materials for use in the aperture layers include, for example, titanium nitride, metals such as chromium, or any other appropriate light-blocking material. The light-blocking material is preferably titanium nitride. Suitable transparent materials for use in the aperture layers include, for example, $SiO_2$, $Si_3N_4$, $Al_2O_3$, $TiO_2$, GaP, and the like. In preferred embodiments, the aperture layer is approximately 100 nm thick.

Laser Rejection Filter Elements

As described above, the integrated analytical devices of the instant disclosure can additionally include features designed to transmit certain wavelengths of light, while significantly decreasing or blocking other wavelengths of light. In particular, it is desirable to transmit as much signal-related light as possible to the detector, and to block all, or at least most, noise-related light.

The arrayed integrated analytical devices of the instant disclosure can therefore additionally and optionally include one or more laser rejection filter elements within a laser rejection filter layer. The laser rejection filter layer is disposed between the excitation source and the detector layer of the integrated devices, typically between the lower light-directing element and the detector layer (as shown in FIG. 4A) but optionally between the upper light-directing element and the lower light-directing element (as shown in FIG. 4B). Such laser rejection filter elements (also known as pump rejection filters or scatter filters) are of particular importance in the case of fully integrated analytical devices, such as the devices of the instant disclosure, since the integrated nature of these devices can place constraints on the aggregate thickness of all layers, and can also increase the angular bandwidth over which the rejection must be assured. For a non-integrated detector device, the deposited layers responsible for rejection of non-signal light can be many tens of microns thick (summing over several filters participating), but typically only need to reject light over an angular range of <10 degrees (including both field of view ("FOV") and filter tilt). For integrated devices such as the devices exemplified herein, however, the layers for pump rejection may need to be as thin as 5 microns or even less.

A further consideration with an integrated device is assuring that the rejected, non-signal light be terminated effectively (i.e., that it be efficiently removed from the optical system, for example by converting it to heat by absorption). For a non-integrated device, such termination is generally not critical, whereas for an integrated device, the reflected light can reach another detector site with a few (in principle, one) reflections, and furthermore, there is no local exit port for the rejected light to escape from the device. For these reasons, it is important to ensure that scattered light be converted to heat efficiently, ideally in one reflection. The detailed properties of two types of laser rejection filter elements suitable for use in the instant integrated devices is described in subsequent sections of the disclosure.

Suitable materials for use in the laser rejection filter elements of the instant devices include, for example, amorphous silicon/silicon oxide interference stacks, polymer-like resists, doped PECVD oxides, organo-silicone with absorbing dyes, and the like. In preferred embodiments, the laser rejection filter elements are thin-film interference filters. In more preferred embodiments, the laser rejection filter elements are prepared from layers of amorphous silicon and silicon oxide.

Similar laser-rejection filter designs have been described in U.S. Patent Application Publication No. 2016/0061740, previously incorporated herein by reference in its entirety.

Multilayer and Hybrid Laser Rejection Filter Elements

An ideal laser rejection filter provides for the deep rejection of optical energy at the wavelengths of sample excitation (e.g., OD>=6 at 532 nm for a typical laser illumination source), displays a broad window of high transmission at the wavelengths of sample emission, and further displays a small Stokes shift between the wavelengths of interest. In addition, it is desirable for a laser rejection filter to display minimal dispersion with angle and polarization, minimal thickness, and controlled termination. Furthermore, the filter stacks are preferably inexpensive and readily manufacturable under conditions (e.g., temperatures) suitable for the manufacture of other components of an integrated device.

In the case of dielectric thin-film laser rejection filters, it can sometimes be challenging in the design of such stacks to obtain adequate filter performance over a wide range of incident angles for the non-signal light. For example, given a specified wavelength range, an edge filter can provide high reflection efficiency but only within a particular range of incident angles (typically from normal incidence up to a certain value). In some of the integrated device designs described herein, in order to keep the scattering photons of the excitation source from reaching the detector, rejection over a wide angular spectrum may be desirable, especially to block photons with higher angle of incidence than a typical thin film stack can adequately support.

The instant disclosure addresses this problem by providing in one aspect multilayer laser rejection filters comprising a low index total internal reflection (TIR) layer in order to reduce transmission of high angle scattering light. Specifically, the low index layer is included in the device stack between the excitation source and the detector layer in order to minimize the background signal. Traditional dielectric long-pass filters reflect rays with lower angles of incidence (e.g., the middle rays in the drawing) more effectively than those with higher angle of incidence (e.g., the outer ray in the drawing). When this filter design is incorporated into an integrated device, the high angle scattering light from the waveguide has a relatively higher chance of being transmitted through the filter stack and reaching the sensor. In the design solution of the instant disclosure, however, a low index TIR layer can be added between the integrated excitation waveguide and a low angle rejection filter, such as a dielectric filter stack. The high angle scattering light experiences total internal reflection upon encountering the low index TIR layer, and after multiple bounces, exits the integrated device from the side. At the same time, the lower angle scattering light is transmitted through the low index TIR layer but is rejected by the dielectric filter stack. The combined effect of the TIR layer and the filter stack thus results in a barrier filter that blocks the scattering light with wide angular spectrum.

One candidate material for the low index TIR layer of the subject multilayer filter stack is air, with almost zero dispersion and low refractive index, but other low index materials are also suitable, including other gases, liquids, and solids having low refractive index and other suitable properties. The specific choice of material for the low index TIR layer will depend on the refractive index and other physical properties of the adjacent layers, as would be understood by those of ordinary skill in the art.

To help collect the scattered light and reduce the chance of multiple scattering, an absorption layer or patch can optionally be added to the device. Materials for use in such an absorption layer are chosen based on their wavelength of absorption, their ability to dissipate optical energy, and their suitability in fabrication of the integrated device.

A variety of configurations of the above-described wide angular spectrum multilayer edge filter are possible, depending on the location, thickness, material choice, and number of layers of the low index layer(s). As described above, the low index layer can be placed directly below the excitation waveguide cladding, thus creating the shortest resonance cavity length and therefore limiting the chances for secondary scattering. The low index layer may, however, alternatively be placed within the thin film stack, or between the thin film stack and the detection layer. These configurations increase the resonance cavity length, and can therefore increase the chance of secondary scattering, but the configurations can advantageously facilitate manufacture of the device.

In any case, incorporation of an additional TIR design constraint into the laser rejection filter design generates added value to the low index layer. For example, by incorporating the low index layer (or layers) as an integral component in the laser rejection filter design, e.g., because the filter is no longer limited to the thin film stack but can include the layers from the excitation waveguide to the detection layer, the integrated device performance can be fully optimized.

The instant disclosure further provides in another aspect laser rejection filter elements comprising a combination of dielectric stacks and absorption layers. Such hybrid filters take advantage of the complementary dependence on angle of incidence of interference coatings and absorption layers. Specifically, as mentioned above, interference coatings for rejection typically perform best for a cone centered on normal incidence, with dispersions that affect performance as a cosine of the angle in the interference thin films, whereas the performance of absorption rejection layers tends to increase with the angle of incidence, with dispersions that affect performance as a cosine of the angle in the absorbing layer. Owing to this complementary nature, a hybrid coating can be achieved with rejection of a target minimum over a wide angle range, in a minimum thickness. This thickness is reduced for higher refractive index thin films, and for lower refractive index absorbing layers. Note that thin films with absorption for the non-signal light (but minimal absorption of signal light) can be used effectively in a hybrid rejection filter.

As an example of an absorption dye suitable for use in combination with a dielectric filter stack, Aptina red1 has an absorption spectrum with high transmission above 600 nm. See Pang et al. (2011) *Lab Chip* 11:3698, FIG. 2. Although the thickness used in this publication was relatively large (8 µm), thinner layers can be used depending on the wavelength of laser excitation of the device. For example, a 5 µm layer provides OD>6 at 532 nm, a 4.7 µm layer provides OD>6 at 540 nm, and a 2.8 µm layer provides OD>6 at 562 nm. Other absorption dyes and pigments suitable for use in the instant hybrid filter stacks are readily identifiable by those of ordinary skill in the art.

In particular, laser rejection by an absorption dye layer, such as by a layer of Aptina red1 dye, advantageously displays no polarization dispersion, weak angle dispersion, and controlled termination of non-signal light. In addition, angularly non-uniform scatter can allow for further thinning of the absorption dye layer. If certain portions of the hemisphere have lower intensity non-signal light to be rejected, or if the intensity has known polarization dependence at some angles, this information can be used to further reduce the hybrid rejection filter thickness (for a given rejection target). The disadvantages of an absorption rejection filter, for example a layer of Aptina red1 dye, include a moderately large extinction coefficient, a relatively large thickness (5 µm), and the need to use sample dyes with a fairly large Stokes shift (532 nm to ~620 nm). These disadvantages can be offset to great extent, however, by the combination of an absorption layer with a dielectric stack in the instant hybrid rejection filters.

With respect to the dielectric stack component of a hybrid rejection filter, particularly advantageous rejection filters (especially those with low dependence on angle) are possible through the use of very high index materials for the interference portion of the filter. Exemplary materials finding utility for these purposes with 532 nm pumps are GaP (gallium phosphide) as the high index material, and $TiO_2$ as the low index material, although other suitable materials could be utilized, as described below, and as would be understood by those of ordinary skill in the art. Of note is that $TiO_2$ is typically used as a high index material for commonly produced coatings. The material also displays, however, a significant angular dispersion (with a blue shift) between 0 and 45 degrees, and a significant polarization dispersion (splitting) between a p-polarized optical signal (upper trace near 570 nm) and an s-polarized optical signal (middle trace near 570 nm).

The optical properties of the dielectric stack component of the hybrid rejection filter can be modulated as desired by the choice of materials used to construct the stack, by the thickness of each layer, and by the number of layers. The dielectric materials utilized to fabricate interference filters are generally nonconductive materials, typically metal salts and metal oxides, having a specific refractive index. Exemplary materials include $SiO_2$, SiO, $Si_2O_3$, $Al_2O_3$, BeO, MgO, $CeF_3$, LiF, NaF, $MgF_2$, $CaF_2$, $TiO_2$, $Ta_2O_5$, $ZrO_2$, $HfO_2$, $Sb_2O_3$, $Y_2O_3$, $CeO_2$, $PbCl_2$, and ZnS. Also of use is GaP, due to its extremely high refractive index. The dielectric stack is preferably designed with overall structure $(H/2\ L\ H/2)^N$, where the H layer is a first material with relatively high refractive index and the L layer is a second material with relatively low refractive index.

The physical thickness of each layer within the stack is chosen based on the desired optical properties, as is understood in the art. The value "N" is the number of repeating units of the structure within the parentheses and is an integer. Transmission in the stop band tends to zero (for a given incidence angle) with increasing overall thickness (e.g., as N increases).

It should be understood that the order of the coatings can be varied in order to achieve optimal performance of the hybrid laser rejection filter elements. For example, the layers can be ordered with absorption first, interference coatings second, or vice versa. The absorbing material can be carried in a host material such as PMMA, and can be shaped or patterned to fit within limited volumes or to permit simpler integration.

The coatings can be created in different process steps, and joined into an assembly, as would be understood by those of ordinary skill in the art.

In some embodiments, the laser rejection filter element is a multilayer or a hybrid rejection filter element.

In specific embodiments, the laser rejection filter element is a multilayer filter element comprising a dielectric interference filter layer and a low index total internal reflectance layer. In more specific embodiments, each of the devices further comprises an absorption layer.

In other specific embodiments, the laser rejection filter element is a hybrid rejection filter element comprising an absorption layer and a dielectric stack layer.

In some embodiments, the laser rejection filter element displays low optical transmission at 532 nm and high optical transmission above 620 nm.

Similar multilayer and hybrid laser rejection filters have been described in U.S. Patent Application Publication No. 2016/0061740, previously incorporated herein by reference in its entirety.

Nanopits for the Immobilization of Analytes

As described above, in the context of a DNA sequencing analysis, a nucleic acid synthesis complex, comprising a polymerase enzyme, a template nucleic acid, and a primer sequence, can be immobilized within an optically confined region, or very small illumination volume, and monitored in real time in order to identify individual nucleotides as they are incorporated into the extended primer sequence. See FIG. 1A. In order to obtain meaningful sequence information, however, it is preferable that no more than one nucleic acid sequence complex (i.e., one analyte or molecule of interest) is present within the illumination volume, for example, within a single nanowell or aperture disposed in or on the surface of an integrated analytical device.

For example, and as described in U.S. Patent Application Publication No. 2011/0257040 A1, in order to reduce the incidence of multiple molecule loading events in the nanowells, it is typical in the art to substantially underload the array with the analyte or molecule of interest. Random distribution of molecules into the array results in one or fewer molecules being loaded into most nanowells when fewer than 37% of all nanowells are loaded. This type of loading is referred to as "Poisson limited" analyte loading, meaning that few enough molecules are added to the array so that a Poisson-style random statistical distribution of the analytes into the array results in one or fewer analytes per nanowell in most cases. In the ZMW context, state of the art yields for single molecule occupancies of approximately 30% have been obtained for a range of ZMW diameters (e.g., 70-100 nm). For this degree of loading, about 60% of the ZMWs in a typical ZMW array are not loaded (e.g., have no analyte molecules). While such random distribution methods are effective in ensuring that, in most cases, not more than a single template or enzyme (or other analyte) molecule is loaded in each observation/reaction volume in an array such as a ZMW array, it would be desirable to develop methods and compositions for increasing the template and enzyme loading density of such arrays. Higher loading densities would permit the simultaneous analysis of more analyte molecules in the array, increasing the throughput of such systems, while simultaneously decreasing analysis costs.

Figure 9:
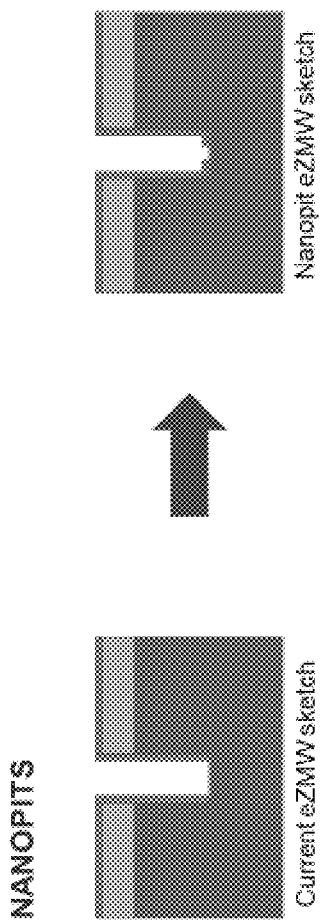
FIG. 9 illustrates the creation of a nanopit at the base of a nanowell.

In order to maximize the loading density of single-analyte nanowells, it is desirable to create a small island of functionality inside each nanowell by engineering slightly different surfaces at the bottom of the nanowell. This small island of functionality, dubbed "the nanopit" preferably ranges in size from an enzyme diameter (~5 nm) to an enzyme+complex entropic exclusion space (~20~30 nm). The enzyme+complex entropic exclusion space corresponds to the space around an enzyme and DNA complex where it is statistically unlikely that another polymerase would be found, simply due to the combination of electrostatic repulsion and Brownian motion. This concept is illustrated in FIG. 9. The island portion of the nanopit preferably has a silica surface and is surrounded by alumina, but other suitable combinations of reactive and non-reactive materials should be considered within the scope of the disclosure. Nanoscale apertures having islands of functionality have been described in U.S. Patent Application Publication No. 2011/0257040 A1.

In some embodiments, nanopits can be formed in the nanowells of the instant arrays of integrated analytical devices by direct printing. Specifically, the nanopit can be simply written directly to the surface of the device array during its fabrication. Techniques available for printing features of such small scale include, for example, electron beam lithography, nanoimprint lithography, and photolithography. Preferably, the nanopit features are printed by photolithography, more specifically deep UV lithography or immersion lithography. Direct printing of nanopits is likely to require features having sizes in the 40 nm to 10 nm range.

Figure 10:
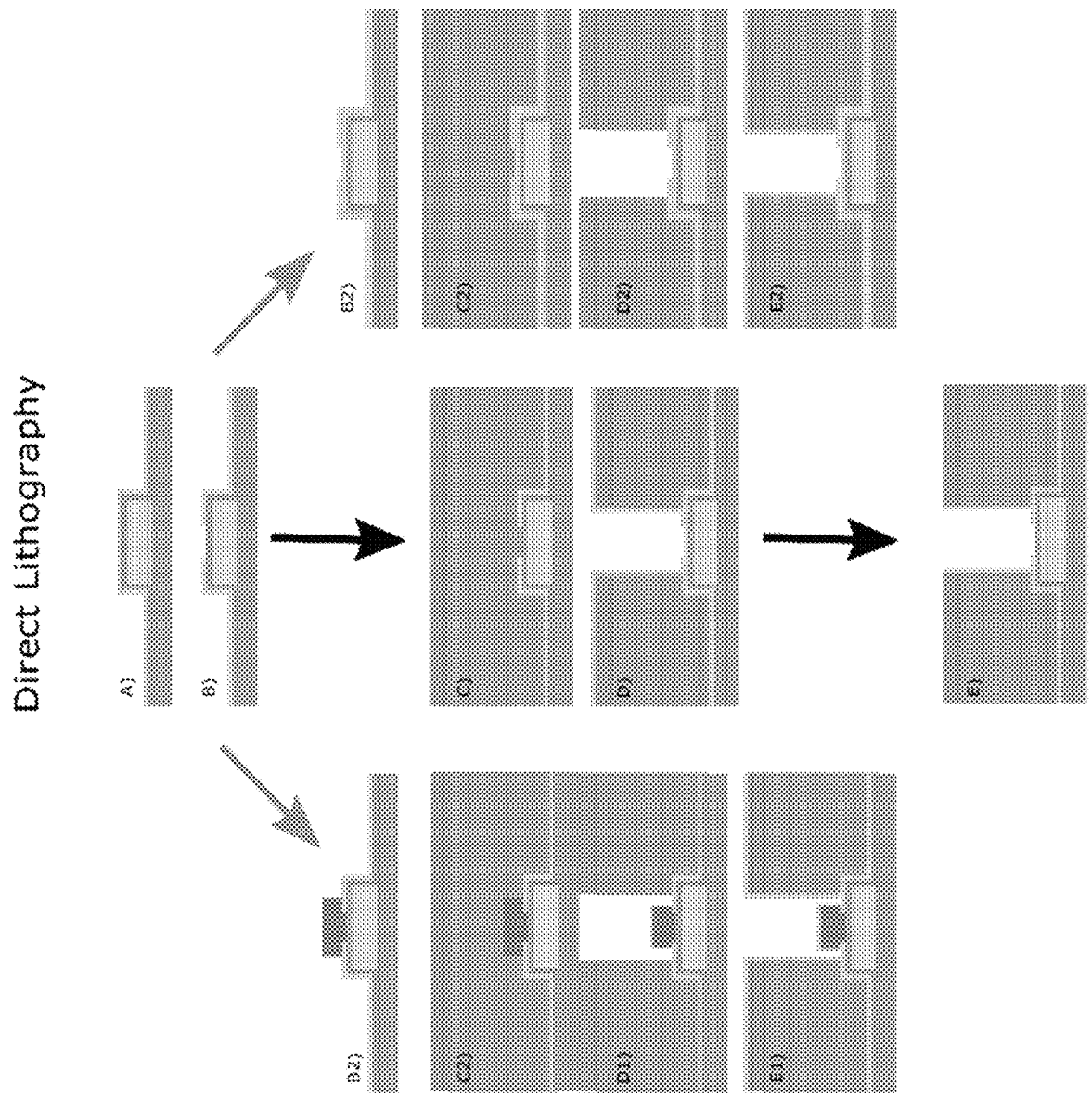
FIG. 10 illustrates a basic process flow for a directly printed nanopit.

FIG. 10 illustrates a basic process flow for the preparation of a nanopit at the bottom of a nanowell by direct printing, following the center line of process. The pit can be patterned during an etch stop process, for example shortly after the completion of an excitation waveguide section (where the waveguide is shown as a rectangle directly below the nanopit in the illustrations of FIG. 10). See U.S. Patent Application Publication No. 2016/0061740 for exemplary process flows. After patterning, the nanopit can be buried for the ZMW part of the manufacturing flow. As shown in the center pathway of FIG. 10, the last steps of the ZMW flow, the "liner process", can then be used to re-expose the nanopit. FIG. 10 also illustrates how, if it is difficult to maintain the nanopit architecture with a simple direct flow, the robustness of the process can be extended either by increasing thickness of the etch stop layer (right side flow of FIG. 10) or by adding a protection on top of the nanopit (left side flow of FIG. 10). Materials for such protection can be, for example, amorphous silicon, which can be removed with high selectivity by a gas phase etch, or a metal, for example titanium nitride and hydrogen peroxide.

Arrays of Integrated Analytical Devices

In order to obtain the volumes of sequence information that can be desired for the widespread application of genetic sequencing, e.g., in research and diagnostics, high throughput systems are desired. As noted above, and by way of example, in order to enhance the sequencing throughput of the system, multiple complexes are typically monitored, where each complex is sequencing a separate template sequence. In the case of genomic sequencing or sequencing of other large DNA components, these templates will typically comprise overlapping fragments of the genomic DNA. By sequencing each fragment, one can then assemble a contiguous sequence from the overlapping sequence data from the fragments.

As described above, and as shown in FIGS. 1A and 1B, the template/DNA polymerase-primer complex of such a sequencing system is provided, typically immobilized, within an optically confined region, such as a zero mode waveguide (ZMW) or nanowell, or proximal to the surface of a transparent substrate, optical waveguide, or the like. Preferably, such reaction cells are arrayed in large numbers upon a substrate in order to achieve the scale necessary for genomic or other large-scale DNA sequencing approaches. Such arrays preferably comprise a complete integrated analytical device, such as, for example, the device shown in the block diagram of FIG. 2 and in the unit cells illustrated in FIGS. 4A-4G, 5A-5D, and 6A-6E. Examples of integrated systems comprising arrays of optical analytical devices are also provided in U.S. Patent Application Publication Nos. 2012/0014837; 2012/0019828; and 2012/0021525.

Arrays of integrated analytical devices, such as arrays of devices comprising ZMWs/nanowells, can be fabricated at ultra-high density, providing anywhere from 1000 ZMWs per $cm^2$, to 1,000,000 ZMWs per $cm^2$, or more. Thus, at any given time, it can be possible to analyze the reactions occurring in from 100, 1000, 3000, 5000, 10,000, 20,000, 50,000, 100,000, 1 Million, 10 million, 25 million, 50 million, 100 million, or even more nanoscale emission volumes or other reaction regions within a single analytical system or even on a single substrate.

Using the foregoing systems, simultaneous targeted illumination of thousands or tens of thousands of ZMWs/nanowells in an array has been described. However, as the desire for multiplex increases, the density of ZMWs on an array, and the ability to provide targeted illumination of such arrays, increases in difficulty, as issues of ZMW cross-talk (signals from neighboring ZMWs contaminating each other as they exit the array), decreased signal:noise ratios arising from higher levels of denser illumination, and the like, increase. The arrays and methods of the instant invention address some of these issues.

Methods for Producing Arrays of Integrated Analytical Devices

In another aspect, the instant disclosure provides methods for producing arrays of integrated analytical devices. As described above, such arrays are useful, for example, in the large-scale sequencing of nucleic acids, including in particular, genomic sequencing. Such arrays can be produced by a variety of methods. One preferred approach for producing the instant arrays involves the use of microfabrication methods such as semiconductor or MEMS processing methods, which have been highly developed for the production of integrated circuits. Similar processes have been used to create MEMS (micro electromechanical systems) for a variety of applications including inkjet printers, accelerometers, pressure transducers, and displays (such as digital micromirror displays (DMDs)). Microfabrication methods can be applied to a large substrate such as a wafer, which can later be diced into many devices, allowing for the production of many devices at one time.

The methods of the invention may, for example, apply resist processes, such as photoresists, to define structural elements on substrates or other layers. Etching processes can be used to produce three-dimensional structures, including component structures in the integrated analytical device. Deposition processes can be used to add layers onto the devices. Other semiconductor processes such as ashing, polishing, release, liftoff, and wet cleans can also be employed to create the structures of the invention, as described in more detail below.

For example, lithographic techniques can be used to define a mask layer out of polymeric materials, such as photoresists, using e.g., conventional photolithography, e-beam lithography, or the like. Alternatively, lithographic techniques can be applied in conjunction with layer deposition methods to deposit metal mask layers, e.g., using aluminum, gold, platinum, chrome, or other conventionally used metals, or other inorganic mask layers, e.g., silica based substrates such as silicon, $SiO_2$, or the like. Alternatively, negative tone processes can be employed to define pillars of resists that correspond to, for example, nanowells. See, e.g., U.S. Pat. No. 7,170,50, which is incorporated by reference herein in its entirety for all purposes. The mask layer can then be deposited over the resist pillars and the pillars are subsequently removed. In particularly preferred aspects, both the underlying substrate and the mask layer are fabricated from the same material, which in particularly preferred aspects, is a transparent substrate material such as an $SiO_2$-based substrate such as glass, quartz, or fused silica.

By providing the mask and underlying layers of the same material, one can ensure that the two layers have the same interactivity with the environments to which they are exposed, and thus minimize any hybrid surface interactions.

In the case of $SiO_2$-based substrates and mask layers, conventional fabrication processes can be employed. For example, a glass substrate bearing a surface-exposed feature, such as a waveguide, can have a layer of resist deposited over its surface. A negative of the mask layer is then defined by appropriate exposure and development of the resist layer to provide resist islands where one wishes to retain access to the underlying feature. The mask layer is then deposited over the surface and the remaining resist islands are removed, e.g., through a lift off process, to provide the openings to the underlying feature. In the case of metal layers, deposition can be accomplished through a number of means, including evaporation, sputtering or the like. Such processes are described in, e.g., U.S. Pat. No. 7,170,50. In the case of silica based mask layers, a chemical vapor deposition (CVD) process can be employed to deposit a silicon layer onto the surface. Following lift off of the resist layer, a thermal oxidation process can convert the mask layer to $SiO_2$. Alternatively, etching methods can be used to etch access points to underlying layers using conventional processes. For example, a silicon layer can be deposited over an underlying substrate. A resist layer is then deposited over the surface of the silicon layer and exposed and developed to define the pattern of the mask. The access points are then etched from the silicon layer using an appropriate differential etch to remove silicon but not the underlying $SiO_2$ substrate. Once the mask layer is defined, the silicon layer is again converted to $SiO_2$ using, e.g., a thermal oxidation process.

In each of the above exemplary microfabrication techniques, the process begins with a clean substrate layer. The substrate layer used in the instant methods can be of any suitable rigid material. The substrate layer material can comprise, for example, an inorganic oxide material such as silica. A preferred substrate layer material comprises a detector layer, such as, for example, a CMOS wafer, i.e., a wafer made up of CMOS sensors or CCD arrays. See, for example, CMOS *Imagers From Phototransduction to Image Processing* (2004) Yadid-Pecht and Etienne-Cummings, eds.; Springer; *CMOS/CCD Sensors and Camera Systems* (2007) Holst and Lomheim; SPIE Press.

As mentioned above, the methods of the invention in some cases use resists for defining and producing structures with lithography. These resists can be, for example, photoresists or e-beam resists. The photoresists can be developed using UV, deep UV, G-line, H-line, I-line or other suitable wavelength or set of wavelengths. The type of resist that is used, and therefore the type of instrumentation that is employed for processing, will depend on the dimensions of the features that are created. In many processes described herein, higher resolution resists and equipment will be used for the production of the nanowell which corresponds to the reaction volume, where the size of the nanowell can be on the order of 10 nm to 500 nm, and a lower resolution resist and associated instrumentation is used for the creation of the rest of the integrated analytical device, which can have features on the dimensions of 1 micron to 20 microns. Many resists are known in the art, and many are available commercially from companies such as Rohm and Haas and Shipley. The resists used in the processes of the invention can be negative or positive photoresists. Where a process is described herein using a negative photoresist, it is to be understood that a suitable positive photoresist can also be employed where practical, and vice versa. Where appropriate, chemical amplification can also be employed in order to increase the sensitivity of the resist. The removal of the resist, the cleaning, rinsing, ashing, and drying of the substrate can be performed as appropriate and as taught and known in the art.

In some cases, the tools used for photolithography of the nanowell use photolithography exposure tool capable of creating structures having feature sizes of about of 10 nm to about 100 nm. Such systems include, for example, an AMSL XT1250 exposure tool.

Etching processes are used in some aspects of the invention in order to produce the three dimensional features in a substrate or in other layers, to fashion, for example, optical elements or lenses, or reaction volumes such as nanowells. The etching process that is used will depend on the type of material used, the dimensions of the features, and the resist system. In some cases wet etching or wet chemical etching is employed. Electrochemical etching can also be employed. In some embodiments plasma etching or reactive ion etching (RIE) is used as an etching process. Deep reactive ion etching (DRIE) can also be employed, for example, where structures having high aspect ratio are desired. Dry vapor phase etching, for example with xenon difluoride, can also be used. Bulk micromachining or surface micromachining can be used as appropriate to create the device structures of the disclosure. The etching used in the methods of the disclosure can be gray-scale etching. The conditions of the resist formation and etching are controlled to produce side walls having the desired geometries, such as having the desired side-wall angle.

Some processes of the invention involve the deposition of reflective layers, or cladding layers. The deposition of these reflective layers can be accomplished by wet processes including spinning on layers from solution, or by gas-phase processes. Suitable processes include electroplating, sputter deposition, physical vapor deposition, evaporation, molecular beam epitaxy, atomic layer deposition, and chemical vapor deposition. Metals can be used as the reflective layer and the cladding layer. Suitable metals include gold, nickel, aluminum, chromium, titanium, platinum, and silver. The reflective and/or cladding layers can comprise aluminum, which can be deposited by sputtering, for example using a commercially available sputter tool available from CVC, Novellus, or MRC.

Where layers are deposited during the processes of the invention, in some cases, the layers are treated before moving on to the next step in the process. For example, the deposited layer can be annealed, planarized, cleaned, passivated, or lightly etched in order to improve its properties.

In some methods of the invention, protective layers or sacrificial layers are deposited. The protective layers can be polymeric layers, or can be inorganic layers. Suitable protective or sacrificial layers include germanium (Ge) and amorphous silicon (a-Si). Protective layers can be used to produce features as described herein. The type of material for the protective or sacrificial layer can be chosen for its selective reactivity, for example to wet chemical etchants. For example, in some cases, the ability to selectively etch germanium with heated hydrogen peroxide in the presence of silicon dioxide and aluminum results in its being utilized to produce optical structures combined with nanowells.

In some processes, a pull-back process can be employed. A pull-back process generally involves etching in from the edges of a feature within a layer in order to reduce the dimensions of the feature. Pull-back can be performed using a wet chemical reagent that selectively reacts with a layer which has exposed edges. In some cases a germanium layer is pulled back using hydrogen peroxide.

Some methods employ a polishing step to remove a surface region from a surface. Suitable methods include chemical-mechanical polishing or chemical-mechanical planarization (CMP).

Some methods of the invention incorporate a planarization layer. The method for depositing the planarization layer depends on the type of material that is used. The planarization layer can be a hard material, such as an inorganic material, for example silicon nitride; it can be a metallic material such as aluminum; or it can be a soft material, such as a polymeric material, e.g. an organic or silicon based polymer. The planarization layer can be a glass, such as a silicon dioxide material. In some cases, the planarization layer comprises a spin-on glass such as a silicate, phosphosilicate or siloxane material. Suitable spin-on glass materials are available, for example, from Honeywell Corporation. The planarization layer can comprise, for example, a glass doped with other agents to control its melting properties, such a boro-phosphoro-silicate glass (BPSG). Suitable polymeric planarization materials include, for example, polyimides.

After the arrays of the instant disclosure are complete, such as by, for example, following the process flow of the example below, the arrays can be further processed, such as, for example, by separating the arrays into individual chips and readying them for sequencing. The further processing steps will depend on the situation but can typically include the following treatments: surface treatment (a series of wet/vapor phase treatments to put down a specific surface that attracts the DNA polymerase enzyme to the bottom of the nanowell); stacking (a process to protect the top surface of the surface-treated device wafer and, in some cases, creating a well for the sequencing mixture); thinning (a process in which the composite top-plated and surface-treated device wafer can be thinned—including grinding lapping, polishing, or other treatments); dicing (a process in which the composite wafer is divided into individual chips using a standard semiconductor dicing saw); and packaging (a process involving a standard pick and place tool to mount the chips onto a substrate and create electrical/optical outputs for data collection). These further processing steps are either known in the art or are disclosed in references such as U.S. Patent Application Publication Nos. 2008/0176769 and 2011/0183409, which are incorporated by reference herein in their entireties for all purposes.

As just noted, the arrays of the invention can be incorporated into analysis systems for analyzing the multiple reactions occurring in the nanowells of the array. The arrays described herein typically have nanowells that are accessible to fluid from the top, and that are accessible for optical analysis from the bottom. The arrays are thus generally incorporated into a vessel into which a reaction mixture of interest is introduced. In some cases, the individual nanowells are all in contact with one volume of fluid, which can have, for example, multiple nucleic acid template molecules which can be analyzed, and which can have the nucleotides, cofactors, and other additives for carrying out the reaction to be analyzed.

The vessel that comprises the array can be placed within an instrument which has the appropriate optical components, computer controls, and data analysis systems. The vessel comprising the array can be held within the instrument such that the reaction conditions, such as the vessel temperature and vessel atmospheric conditions, can be controlled. The vessel atmospheric conditions can comprise the makeup of the gas above the sample, for example the humidity, and the level of other gaseous species such as oxygen.

It will be readily apparent to one of ordinary skill in the relevant arts that other suitable modifications and adaptations to the methods and applications described herein can be made without departing from the scope of the invention or any embodiment thereof. While specific examples have been provided, the above description is illustrative and not restrictive. Any one or more of the features of the previously described embodiments can be combined in any manner with one or more features of any other embodiments in the present invention. Furthermore, many variations of the invention will become apparent to those skilled in the art upon review of the specification. The scope of the invention should, therefore, be determined by reference to the appended claims, along with their full scope of equivalents.

All patents, patent publications, and other published references mentioned herein are hereby incorporated by reference in their entireties as if each had been individually and specifically incorporated by reference herein.

What is claimed is:

1. An array of integrated analytical devices, each device comprising:
    a nanoscale emission volume;
    an excitation source optically coupled to the nanoscale emission volume;
    a detector layer optically coupled to the nanoscale emission volume;
    an upper light-directing element disposed between the nanoscale emission volume and the detector layer; and
    a lower light-directing element disposed between the upper light-directing element and the detector layer;
    wherein an optical signal is emitted from the nanoscale emission volume; and
    wherein the upper light-directing element and the lower light-directing element direct the optical signal from the nanoscale emission volume to a sensing region in the detector layer.

2. The array of claim 1, wherein each device in the array has a maximum lateral dimension of no more than about 3.0 µm.

3. The array of claim 1, wherein each device in the array has a maximum vertical dimension of no more than about 25 µm.

4. The array of claim 1, wherein there is a distance between the nanoscale emission volume and the upper light-directing element that is no more than about 5 µm.

5. The array of claim 1, wherein there is a distance between the lower light-directing element and the sensing region that is no more than about 5 µm.

6. The array of claim 1, wherein the lower light-directing element comprises a truncated cone shape, a cylindrical pillar shape, an oval pillar shape, a square pillar shape, a rectangular pillar shape, or a combination of these shapes.

7. The array of claim 6, wherein the lower light-directing element comprises a truncated cone shape.

8. The array of claim 7, wherein the lower light-directing element comprises a plurality of truncated cone shapes.

9. The array of claim 6, wherein the lower light-directing element comprises a cylindrical pillar shape.

10. The array of claim 6, wherein the lower light-directing element comprises a truncated cone shape and a cylindrical pillar shape.

11. The array of claim 1, wherein the lower light-directing element comprises a high-index core material embedded in a low-index cladding material.

12. The array of claim 1, wherein the optical signal is generated by a plurality of optical emitters within the nanoscale emission volume.

13. The array of claim 12, wherein each optical emitter in the plurality of optical emitters has a different amplitude of emission.

14. The array of claim 1, wherein the detector layer of each device comprises a single sensing region.

15. The array of claim 1, wherein the upper light-directing element comprises a diffractive optical element.

16. The array of claim 15, wherein the diffractive optical element is a Fresnel lens.

17. The array of claim 1, wherein the upper light-directing element comprises amorphous silicon.

18. The array of claim 1, further comprising a laser-rejection filter.

19. The array of claim 18, wherein the laser-rejection filter comprises a thin-film interference filter.

20. The array of claim 18, wherein the laser-rejection filter is configured to decrease transmission of an excitation signal from the excitation source.

21. The array of claim 18, wherein the laser-rejection filter is configured to allow transmission of the optical signal emitted from the nanoscale emission volume.

22. The array of claim 18, wherein the laser-rejection filter is disposed between the lower light-directing element and the detector layer.

23. The array of claim 18, wherein the laser-rejection filter is disposed between the upper light-directing element and the lower light-directing element.

24. The array of claim 18, wherein the laser-rejection filter comprises a selectively absorptive material.

25. The array of claim 24, wherein the selectively absorptive material is a dielectric material.

26. The array of claim 25, wherein the dielectric material is amorphous silicon or silicon nitride.

27. The array of claim 18, wherein the laser-rejection filter and the lower light-directing element comprise a selectively absorptive material.

28. The array of claim 1, further comprising an analyte disposed within the nanoscale emission volume.

29. The array of claim 28, wherein the analyte comprises a biological sample.

30. The array of claim 29, wherein the biological sample comprises a nucleic acid.

31. The array of claim 30, wherein the biological sample comprises a polymerase enzyme.

32. The array of claim 1, wherein the array comprises at least 1,000 nanoscale emission volumes.

33. The array of claim 1, wherein the lower light-directing element comprises a carbon-rich amorphous silicon material.

34. The array of claim 6, wherein the truncated cone shape, the cylindrical pillar shape, the oval pillar shape, the square pillar shape, the rectangular pillar shape, or the combination of these shapes comprises a carbon-rich amorphous silicon material.

35. The array of claim 7, wherein the truncated cone shape comprises a carbon-rich amorphous silicon material.

36. The array of claim 10, wherein the truncated cone shape and the cylindrical pillar shape comprise a carbon-rich amorphous silicon material.

37. The array of claim 11, wherein the high-index core material comprises a carbon-rich amorphous silicon material.

* * * * *